(12) United States Patent
Buri et al.

(10) Patent No.: US 9,725,599 B2
(45) Date of Patent: Aug. 8, 2017

(54) SURFACE-MINERALIZED ORGANIC FIBERS

(75) Inventors: Matthias Buri, Rothrist (CH); René Vinzenz Blum, St. Urban (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 690 days.

(21) Appl. No.: 12/735,019

(22) PCT Filed: Dec. 2, 2008

(86) PCT No.: PCT/EP2008/066627
§ 371 (c)(1),
(2), (4) Date: Aug. 5, 2010

(87) PCT Pub. No.: WO2009/074491
PCT Pub. Date: Jun. 18, 2009

(65) Prior Publication Data
US 2010/0331457 A1   Dec. 30, 2010

Related U.S. Application Data

(60) Provisional application No. 61/008,220, filed on Dec. 19, 2007.

(30) Foreign Application Priority Data

Dec. 12, 2007  (DE) ........................ 10 2007 059 736

(51) Int. Cl.
| | | |
|---|---|---|
| C08K 3/22 | (2006.01) |
| C09C 1/02 | (2006.01) |
| D21C 9/00 | (2006.01) |
| D21H 11/20 | (2006.01) |
| D06M 11/76 | (2006.01) |
| D06M 15/59 | (2006.01) |
| D06M 23/08 | (2006.01) |
| D21H 15/02 | (2006.01) |
| D21H 15/12 | (2006.01) |
| B27N 1/02 | (2006.01) |

(52) U.S. Cl.
CPC ............ *C09C 1/021* (2013.01); *D06M 11/76* (2013.01); *D06M 15/59* (2013.01); *D06M 23/08* (2013.01); *D21C 9/002* (2013.01); *D21H 11/20* (2013.01); *B27N 1/02* (2013.01); *C01P 2002/30* (2013.01); *C01P 2004/03* (2013.01); *C01P 2004/51* (2013.01); *C01P 2006/12* (2013.01); *C01P 2006/22* (2013.01); *C01P 2006/62* (2013.01); *C01P 2006/64* (2013.01); *D21H 15/02* (2013.01); *D21H 15/12* (2013.01); *Y10T 428/2927* (2015.01); *Y10T 428/2933* (2015.01)

(58) Field of Classification Search
CPC ............... C08K 7/02; C08K 3/14; C08K 9/04

USPC .............................. 524/13, 35; 428/372, 375
See application file for complete search history.

(56) References Cited

U.S. PATENT DOCUMENTS

| | | | |
|---|---|---|---|
| 2,926,116 A | 2/1960 | Keim | |
| 4,187,192 A | 2/1980 | Sheridan | |
| 4,219,365 A | 8/1980 | Dietz et al. | |
| 4,547,331 A | 10/1985 | Batstra | |
| 4,795,768 A * | 1/1989 | Ancker et al. ................ 523/200 |
| 4,952,278 A | 8/1990 | Gregory et al. | |
| 5,017,268 A * | 5/1991 | Clitherow et al. ............ 162/146 |
| 5,076,846 A | 12/1991 | Buri et al. | |
| 5,120,365 A | 6/1992 | Kogler | |
| 5,152,835 A | 10/1992 | Nemeh | |
| 5,169,441 A * | 12/1992 | Lauzon ......................... 106/416 |
| 5,229,094 A | 7/1993 | Clauss et al. | |
| 5,344,487 A | 9/1994 | Whalen-Shaw | |
| 5,401,482 A | 3/1995 | Clauss et al. | |
| 5,439,558 A | 8/1995 | Bergmann et al. | |
| 5,449,402 A | 9/1995 | Whalen-Shaw | |
| 5,454,864 A | 10/1995 | Whalen-Shaw | |
| 5,472,498 A | 12/1995 | Stephenson et al. | |
| 5,482,569 A * | 1/1996 | Ihara et al. ................... 136/251 |
| 5,509,960 A | 4/1996 | Simpson | |
| 5,554,215 A | 9/1996 | Simpson | |
| 5,562,978 A | 10/1996 | Jacobson | |
| 5,584,924 A | 12/1996 | Arrington-Webb et al. | |
| 5,605,568 A | 2/1997 | Naydowski et al. | |
| 5,662,731 A | 9/1997 | Andersen et al. | |
| 5,676,747 A | 10/1997 | Brown | |
| 5,886,069 A | 3/1999 | Bolt | |
| 6,074,524 A * | 6/2000 | Wu et al. ...................... 162/100 |
| 6,143,064 A | 11/2000 | Virtanen | |

(Continued)

FOREIGN PATENT DOCUMENTS

| | | |
|---|---|---|
| CA | 2180971 | 12/1997 |
| DE | 1208170 | 7/1961 |

(Continued)

OTHER PUBLICATIONS

The International Search Report dated May 6, 2009 for PCT Application No. PCT/EP2008/066627.

(Continued)

*Primary Examiner* — Hannah Pak
(74) *Attorney, Agent, or Firm* — Amster, Rothstein & Ebenstein LLP

(57) ABSTRACT

The present invention relates to surface-mineralized organic fibers comprising organic fibers having a length in the millimeter range, the surface of which is at least partially coated with finely divided alkaline earth carbonate nanoparticles by means of binders based on copolymers comprising as monomers one or more dicarboxylic acids and one or more monomers from the group of diamines, triamines, dialkanolamines or trialkanolamines and epichlorohydrin, a method for producing such surface-mineralized organic fibers, aqueous slurries thereof, their use in papermaking, in surface finishing of paper, plastic, cement and clay surfaces, in paints and varnishes and the use of the inventive binders for coating the organic fibers with nano alkaline earth carbonates.

64 Claims, 13 Drawing Sheets

(56) References Cited

U.S. PATENT DOCUMENTS

| | | | |
|---|---|---|---|
| 6,376,578 | B1 | 4/2002 | Gorzynski et al. |
| 6,402,824 | B1 * | 6/2002 | Freeman et al. ............... 106/464 |
| 6,414,074 | B1 | 7/2002 | Blum |
| 6,511,536 | B1 | 1/2003 | Noguchi et al. |
| 6,666,953 | B1 | 12/2003 | Gane et al. |
| 7,374,279 | B2 * | 5/2008 | Sekiya ......................... 347/100 |
| 7,727,323 | B2 | 6/2010 | Tarng et al. |
| 2001/0000063 | A1 | 3/2001 | Silenius et al. |
| 2001/0033820 | A1 | 10/2001 | Yaniv |
| 2002/0153110 | A1 * | 10/2002 | Yamaguchi et al. .......... 162/123 |
| 2003/0114631 | A1 | 6/2003 | Walton et al. |
| 2004/0020410 | A1 | 2/2004 | Gane et al. |
| 2004/0135846 | A1 * | 7/2004 | Sekiya ............................ 347/47 |
| 2004/0255820 | A1 | 12/2004 | Chen et al. |
| 2005/0006041 | A1 | 1/2005 | Gane et al. |
| 2006/0045997 | A1 | 3/2006 | Hladik et al. |
| 2006/0065380 | A1 * | 3/2006 | Garnier et al. ................ 162/158 |
| 2006/0069224 | A1 * | 3/2006 | Pritschins et al. ........... 526/318.2 |
| 2007/0181275 | A1 * | 8/2007 | Ball ............................ 162/181.2 |
| 2007/0185258 | A1 | 8/2007 | Suau et al. |
| 2009/0162638 | A1 | 6/2009 | Buri et al. |
| 2009/0169894 | A1 | 7/2009 | Buri et al. |
| 2010/0297426 | A1 | 11/2010 | Gane et al. |
| 2011/0237730 | A1 | 9/2011 | Buri et al. |

FOREIGN PATENT DOCUMENTS

| | | |
|---|---|---|
| DE | 1546369 | 5/1970 |
| DE | 3312778 A1 | 11/1983 |
| DE | 10115570 A1 | 10/2002 |
| DE | 102006026965 A1 | 12/2007 |
| DE | 102007004124 A1 | 8/2008 |
| EP | 0403849 A2 | 12/1990 |
| EP | 0757999 A1 | 2/1997 |
| EP | 0930345 A2 | 7/1999 |
| EP | 0935020 A1 | 8/1999 |
| EP | 1072650 A1 | 1/2001 |
| EP | 1 548 187 A2 | 6/2005 |
| EP | 1 918 456 A1 | 5/2008 |
| FR | 2256061 | 4/1983 |
| GB | 839712 | 6/1960 |
| GB | 996388 | 6/1965 |
| JP | 59120657 | 7/1984 |
| JP | 9132514 | 5/1997 |
| JP | 2242998 | 2/2010 |
| WO | 9202468 | 2/1992 |
| WO | 9208755 A | 5/1992 |
| WO | 9628517 | 9/1996 |
| WO | 9632448 A1 | 10/1996 |
| WO | 9701670 A1 | 1/1997 |
| WO | 9732934 A | 9/1997 |
| WO | 9835095 A1 | 8/1998 |
| WO | 9914432 A1 | 3/1999 |
| WO | 9952984 | 10/1999 |
| WO | 0100712 A1 | 1/2001 |
| WO | 03078734 A | 9/2003 |
| WO | 2005100690 A1 | 10/2005 |
| WO | 2006109168 A2 | 10/2006 |
| WO | 2006109171 A1 | 10/2006 |
| WO | 2006123235 A1 | 11/2006 |
| WO | 2007063182 A2 | 7/2007 |
| WO | 2007141260 A1 | 12/2007 |
| WO | WO 2007/141271 A1 | 12/2007 |

OTHER PUBLICATIONS

The Office Action dated Aug. 19, 2008 for German Application No. 10 2007 059 736.5.

Yang et al. "Nanostructured Modification of Mineral Particle Surfaces in $Ca(OH)_2$—$H_2$—$CO_2$ System." Journal of Materials Processing Technology, 170:1-2, Dec. 2005, pp. 58-63.

* cited by examiner

SURFACE-MINERALIZED ORGANIC FIBERS

This is a U.S. national phase of PCT Application No. PCT/EP2008/066627, filed Dec. 2, 2008, which claims the benefit of German Application No. 10 2007 059 736.5, filed Dec. 12, 2007 and U.S. Provisional Application No. 61/008,220, filed Dec. 19, 2007.

The present invention relates to surface-mineralized organic fibers, comprising organic fibers having a length in the millimeter range, their surface being coated at least partially with finely divided alkaline earth carbonate particles in the nanometer range by means of binders, a method for producing such surface-mineralized organic fibers, aqueous slurries thereof, their use in papermaking, in surface-finishing of paper, in and/or on plastics, cement and clay surfaces, in paints and inks and the use of the inventive binders for coating the organic fibers with alkaline earth carbonates nanoparticles.

Pigments and/or fillers based on calcium carbonate particles in the nanometer range (so-called "nanoparticles") are known and are used in numerous applications including paper, ink and plastic applications. Such fine pigments and fillers are manufactured economically by wet milling in the presence of dispersants. Optionally one or more fractionation steps, e.g., by means of centrifuges are also connected downstream. The dispersants and milling aids include, for example, strongly anionic polyphosphates and sodium polyacrylates.

Fibers of renewable raw materials, so-called "sustainable" organic fibers, e.g., wood fibers, cellulose fibers, cotton fibers are also known and are used in the same or similar applications. The combination of same as a blend in papermaking is also known.

It is also known that very fine pigments or fillers in the nanometer range such as nano alkaline earth carbonates in mixture with fibers are subject to a marked segregation, especially under the influence of a flow. The term "segregation" refers to the process of separation of different elements in a field of observation with a tendency toward a spatial distribution of the elements according to certain properties. For example, the fiber material is separated from the nano alkaline earth carbonate in screening a mixture of fibers and nano alkaline earth carbonates. There is a separation, with the nano alkaline earth carbonates or a partial fraction thereof being "segregated" from the whole.

This segregation leads to a heterogeneous distribution of filler in the Z axis of the paper, for example, or in the coating on a porous surface, and this is in turn a disadvantage in printing the paper. The filler content to be achieved also depends greatly on the segregation of the two components in papermaking.

The segregation of pigment and/or filler fiber mixtures also yields a different filler content in the paper and also a different pore volume of the paper, e.g., in papermaking, because the free nanoparticles are segregated from and washed out of the fibers, thereby altering the pores of the paper, which is important in particular when the paper should absorb a certain volume of liquid from the printing ink within a certain period of time in the subsequent printing operation.

A number of such mixtures, their production and use in papermaking are known and described in the state of the art. It is known that retention agents based on vinyl polymers such as polyacrylamides, which serve primarily as flocculants, may be used. Dual systems are also known in which swellable clay minerals such as bentonites or silicates are used in combination with polyacrylamides.

One method for improving the whiteness according to WO 97/32934 consists of coating the pigment particles with other pigment particles such as finely divided particles of precipitated calcium carbonate but using it without a binder, which can lead to the problems mentioned above. In addition, the internal particle consists of a very special mineralogical composition of feldspars formed by calcining calcium carbonate and kaolin.

EP 0 403 849 A2 describes a paper structure that has both a high opacity and a high tensile strength due to the introduction of expanded fibers and an opacifying mineral pigment such as titanium dioxide or calcium carbonate. The addition of expanded fibers to the paper structure permits an increase in the opacity of the paper due to the use of conventional mineral pigments without having a negative influence on the tensile strength of the paper. However, no surface mineralization of the fibers by the pigment is described, whether with or without binders. The fibers and the pigment are added to the pulp independently from one another during papermaking and therefore are subject to the segregation effect.

WO 97/01670 A1 relates to a filler used in papermaking and consisting primarily of calcium carbonate as well as its production. The filler consists of porous aggregates of calcium carbonate particles which are precipitated on the surface of fibers, e.g., cellulose fibers. The fillers described here are based on the fact that calcium carbonate can be precipitated on the very fine fibers so that it adheres to the fibers. Among other things, this is due to the great fineness of the fibers, which have a length of max. 400 µm. There is no mention here of a binder for binding fillers to fibers.

EP 0 930 345 A2 and EP 0 935 020 A1 describe fillers similar to those described in WO 97/01670 A1, but here the calcium carbonate is not precipitated on the surface of the fibers but instead is mixed with them, wherein not only previously precipitated calcium carbonate may be used but also natural ground calcium carbonate may be used. The fibers have a fineness similar to that mentioned above, namely at most a P50 screen fraction, i.e., a maximum length of about 300 µm. Here again, no binders are used or mentioned for forming surface mineralized fibers. The fibers and pigments are added to the pulp independently of one another so that the components are largely separate from one another in the pulp and have the disadvantages associated with segregation.

WO 2007/063182 A2 relates to the control of different fiber fractions in papermaking and describes the production of paper from a fiber raw material which is fractionated into a long fiber fraction and a short fiber fraction which are mixed with additives, combined again and then supplied to the papermaking process. The additives include fillers, substances that capture anionic interfering substances, retention aids, etc. It is mentioned here that the retention of fillers can be increased by mixing them with the fine fiber fraction and adding retention agents such as starch in that the fine fibers form agglomerates with the fillers. The use of binders which allow a uniform distribution of the fillers on the fibers and prevent agglomeration is not mentioned.

WO 98/35095 describes a method for making paper which comprises mixing an aqueous slurry of mineral filler with an aqueous slurry of wood fibers and the addition of flocculants wherein an essential portion of the filler is in the interior of the cellulose fibers. The filler and the flocculant are added to the pulp fibers independently of one another. The fillers are flocculated within the fibers and are kept in the interior, while the filler forms agglomerates outside of the fibers. The use of a binder which produces a uniform distribution of the filler on the surface of the fibers is not mentioned here either.

WO 96/32448 describes a method for producing structured calcium carbonate pigments for coating paper by selectively aggregating fine and ultrafine anionically dispersed calcium carbonate particles by means of a cationic aggregating agent. The aggregating agents described here may include, among others, polyDADMAC (polydiallyldimethylammonium chloride), salts of divalent and trivalent cations or polyamineamide-epichlorohydrin. The specific coating of nanoparticles of one species on microparticles of another species with a chemically different surface is not mentioned. Instead, this publication states that particles of the same species form aggregates with themselves using a plurality of different chemical aids, with an increase in the size of the resulting particles. An increase in the size of the primary particles, as described in this document, may in turn lead to an unwanted change in the original pigment properties.

Unpublished German patent applications DE 10 2006 026 965 and DE 10 2007 004 124 describe composites, comprising organic and/or inorganic pigments and/or fillers in the form of microparticles whose surface is at least partially coated with finely divided calcium carbonate and/or dolomite particles in the nanometer range by means of binders, a method for producing such composites, aqueous slurries thereof and their use in papermaking or in the field of production of paints and plastics as well as the use of the binders for coating the microparticles with nano calcium carbonate and/or nano dolomite. However, these composites have the disadvantage that they do not additionally form a composite with the fibers and therefore they cannot be retained to a sufficient extent in filtration, which leads to the problems described above in printing paper, for example.

DE 10115570 describes a decorative raw paper having a pigment content of 10 to 60 wt %. The pigments comprise a titanium dioxide in the range of 0.4 to 1.5 µm pretreated specially with silicon and aluminium, and talc having an average particle diameter in the range of <2 to 3 µm. These two types of pigments, titanium dioxide and talc, have completely different surface properties with respect to alkaline earth carbonates. Carbonate minerals furthermore cannot be used in this application because when the decorative raw paper is subsequently pressed with phenolic resins, acid is split off and would thus partially decompose the carbonate. The refractive index of carbonate furthermore is 1.5-1.7, which is in the same range as the resins used and therefore the opacity is inadequate. Therefore, nano alkaline earth carbonates are not mentioned. In addition, the impregnation of cellulose with epichlorohydrin and tertiary amines is described, but not in the presence of nano alkaline earth carbonates. For wet strengthening of paper, >1% epichlorohydrin is used, but this is also not in the presence of nano alkaline earth carbonates. The formation of a composite is not mentioned in general or specifically with respect to fibers and pigments as possible components.

WO 99/14432 describes a method for making paper by mixing anionic starch, carboxymethylcellulose or other polymeric binders together with a cationic inorganic or polymeric coagulant to form a thin cellulose pulp stock, and this suspension is then flocculated by means of an anionic swellable clay or other anionic retention aids.

Thus, a number of mixtures and composites are known in the state of the art, which can be used to control certain properties of pigments and/or fillers. However, none of these documents discusses how to overcome the disadvantages of the segregation of pigment-fiber mixtures mentioned in the introduction, especially when a high filler content in the paper or a uniform surface coating of nano pigment and fibers is to be achieved.

Furthermore, problems occur with a number of the aforementioned composites such as agglomeration of the individual components with themselves or the composites with one another, leading to the formation of much larger particles.

In general, fine particles are also more difficult to retain. Therefore, preferably microparticles are used as fillers today. When finer particles are to be retained, a lot of retention agent is necessary, but this also leads to fiber flocculation and poor paper formation.

Consequently, the object of the present invention is to provide fiber-pigment and/or filler composites as well as aqueous slurries thereof, which not only have good optical properties, e.g., with respect to opacity and whiteness and good printing properties and have only an insignificant tendency toward segregation or none at all under the processing conditions to which they are exposed, but instead also allow the production of a paper and/or cardboard having an increased filler content of nanoparticles that are otherwise difficult to retain because of their fineness.

Another object of the present invention is to provide a method for producing such composites.

Another object of the present invention is the use of the inventive composites, e.g., in papermaking and in paints and spackling compounds for use on a porous substrate such as clay, cement or wood that tend to absorption of particles of different sizes in different amounts, which may in turn lead to segregation of mixtures.

Another aspect of the present invention is the use of the inventive composites as fillers in plastics for promoting and supporting biodegradability.

Finally, another object of the present invention is the use of specially selected binders in the coating of fiber particles with alkaline earth carbonate nanoparticles.

The features defined in the independent claims serve to achieve these objects.

Advantageous embodiments of the present invention are derived from the dependent claims and the following description.

The object of the present invention is achieved by surface-mineralized organic fibers, comprising organic fibers coated at least partially with a composition comprising nano alkaline earth carbonate particles by means of a binder.

The binder consists of a copolymer comprising as the monomer one or more dicarboxylic acids and one or more monomers from the group of diamines, triamines, dialkanolamines or trialkanolamines and epichlorohydrin.

According to the invention, the length of the fibers is primarily in the millimeter range and the width and thickness of the fibers is in the micrometer range, while the spherical equivalent diameter of the alkaline earth carbonate nanoparticles used for the coating is primarily in the nanometer range.

A particle in the nanometer range is defined according to the present invention as a particle having a spherical equivalent diameter of less than or equal to 200 nm.

A fiber is defined according to this invention as a particle having a length in the millimeter range. The millimeter range according to this invention is in the range from 0.1 mm to 9.9 mm. The width or thickness of the inventive fibers is in the range of 10 µm to about 1000 µm, in particular from about 20 µm to about 500 µm.

The so-called spherical equivalent diameter is a measure of the size of an irregularly shaped particle. It is calculated from a comparison of a property of the irregular particle with a property of a regularly shaped particle. Depending on the choice of the property used for comparison, various equivalent diameters are differentiated. In the present case, the equivalent diameter is considered with regard to the sedimentation properties of the particles investigated.

The sedimentation and thus the equivalent diameter of the particles as well as their distribution according to this invention are determined by the sedimentation method, i.e., a sedimentation analysis in a gravimetric field using the Sedigraph 5100 from the company Micromeritics, USA. Those skilled in the art are aware of this method and this device which are used throughout the world for determining the degree of fineness of fillers and pigments. The measurement is performed in an aqueous solution of 0.1 wt % $Na_4P_2O_7$. The samples were dispersed using a high-speed stirrer and ultrasound.

The length and width of the fibers can be determined by SEM and light microscopy.

The inventive binder has especially good binding properties in combination with the fibers and the nano alkaline earth carbonate compositions. Most of the nano alkaline earth carbonate composition used is thus bound permanently to the surface of the fibers, which leads to an improved structure when the surface-mineralized organic fibers are used and thus allows optimization of the pore volume to the respective application. Likewise, the ash content of a paper or cardboard can be regulated better. The ash content is understood here to be the residue of a paper after incineration in a calcining oven at 550° C. until reaching a constant weight.

The nano alkaline earth carbonate used for the coating is preferably selected from the group comprising natural ground calcium carbonate (GCC, ground calcium carbonate), natural and/or synthetic precipitated calcium carbonate (PCC, precipitated calcium carbonate), mixed carbonates such as dolomite and mixtures thereof.

If GCC is especially preferred for use as nanoparticles, in particular from marble, limestone and/or chalk, preferably containing at least 95 wt %, in particular more than 98 wt % calcium carbonate.

If GCC and/or PCC is/are used as nanoparticles, it preferably has a vateritic, calcitic or aragonitic crystal structure. The calcitic structure in particular is advantageous.

In a preferred embodiment, GCC and/or PCC may have a $^{14}C$-isotope content, preferably having a decay rate of 1 to 890 decays per hour per gram, and especially preferably 10 to 450 decays per hour per gram for natural GCC and 250 to 890 decays per hour per gram for PCC. Such carbonates are described in WO 2006/123235, for example.

Dolomite according to the present invention is understood to refer to dolomite rock. Dolomite rock is a special carbonate rock consisting primarily of dolomite mineral, i.e., a calcium-magnesium carbonate mineral having the chemical composition $CaMg(CO_3)_2$ ("$CaCO_3.MgCO_3$"). Dolomite mineral contains at least 30 wt % $MgCO_3$, better yet, more than 35 wt %, more than 40 wt %, ideally 45 to 46 wt % $MgCO_3$.

In comparison with limestone consisting mainly of calcium carbonate $CaCO_3$, dolomite rock is harder and more brittle and has a higher density. It is differentiated from the former in particular in that dolomite gives hardly any reaction when treated with cold acid whereas limestone dissolves with effervescence (formation of $CO_2$).

Regarding the nano dolomite for the coating according to the present invention, the use of ground natural dolomite rock containing at least 50 wt %, preferably more than 75 wt % dolomite mineral, more preferably more than 90 wt %, especially preferably more than 98 wt % dolomite mineral is especially preferred.

Especially suitable dolomites according to the present invention occur, for example, in Europe, e.g., Norway, or in South America. The dolomite obtained from southwest Norway, the region around Bergen, is used especially preferably.

In a preferred embodiment, the organic fibers essentially have a length of about 0.1 mm to about 9.9 mm, preferably from about 0.5 mm to about 7.5 mm, in particular from about 1 mm to about 5 mm, e.g., 3 mm. An especially preferred form contains mixtures thereof.

The width or thickness of the inventive organic fibers is preferably in a range of 10 µm to about 1000 µm, preferably from about 20 µm to about 750 µm, in particular from about 50 µm to about 200 µm, e.g., 100 µm.

The ratio of length to width or length to height of the organic fibers is preferably 1:1 to 100:1; for cellulose fibers is preferably at least 25:1, more preferably at least 50:1, better yet at least 75:1, most preferably at least 100:1 and for ground wood pulp is preferably 2:1 to 10:1.

In an especially preferred embodiment, so-called sustainable organic fibers, i.e., fibers from renewable raw materials are especially suitable for use in the present invention, e.g., wood fibers, cellulose fibers, cotton fibers or mixtures thereof.

In an especially preferred embodiment, about 90% to 100%, preferably 92% to 99%, more preferably 94% to 98%, especially preferably 96% to 98%, e.g., 97±0.5% of the alkaline earth carbonate nanoparticles, based on the number N of alkaline earth carbonate nanoparticles, have a spherical equivalent diameter of less than 200 nm, preferably less than 150 nm, more preferably less than 100 nm. The diameter is preferably in a range from 20 nm to 200 nm, 50 nm to 180 nm or 70 nm to 150 nm.

The grain size distribution was measured using the sedimentation method as described above by using a Sedigraph 5100 device from the company Micromeritics, USA and was printed out as a throughput-summation curve using an X-Y plotter, where the X axis shows the particle diameter as the corresponding spherical equivalent diameter and the Y axis shows the corresponding particle content in weight percent (see, for example, P. Belger, Schweizerische Vereinigung der Lack-und Farbenchemiker, XVII FATIPEC Congress, Lugano, Sep. 23-28, 1984).

The percentage amount of particle count N % of nanoparticles is calculated from the measurement results obtained, using the following method.

The values are taken from the Sedigraph curve. The difference between 0 and 0.2 µm yields the 0.1 µm value (100 nm); the difference between 0.2 µm and 0.4 µm yields the 0.3 µm value (300 nm), etc. The total of the differences is standardized to 100 mg and the quantities of each range are calculated from that. It is assumed in the calculation that the particles are spherical having a diameter d of the average of the difference range. The volume V of a particle is calculated from this:

$$V=0.5236d^3$$

and from this the weight G of a particle (divided by the specific density, e.g., for $CaCO_3$: 2.7 g/cm$^3$) is calculated:

$$G=V/2.7.$$

By dividing the particle weight, the number of particles can be calculated from the weight of the respective fraction and then the percentage distribution in N %.

If the nano alkaline earth carbonate to be used for the coating does not yet have the desired or required fineness, i.e., particle size, it can be milled in one or several dry or wet milling steps, preferably several, e.g., one or two dry and/or wet, preferably aqueous milling steps to yield the corresponding particle diameter.

Milling may be performed in all milling equipment known to those skilled in the art for milling alkaline earth carbonates. The usual ball mills, jet plate mills, are especially suitable for dry milling; combinations of such mills or combinations of one or more such mills with cyclones and classifiers are also suitable. Conventional attritor mills, such as those distributed by the company Dynomill, for example, are suitable for wet milling.

In the case of dry milling, ball mills are preferred and iron and/or porcelain balls having a diameter of 0.5-10 cm, especially preferably iron cylpebs having a diameter of 2.5 cm are especially preferred for use as milling bodies. In wet milling, milling balls made of zirconium silicate, zirconium dioxide and/or baddeleyite having a size of 0.2-5 mm, preferably 0.2-2 mm, but also 0.5-5 mm, e.g., 0.5-2 mm diameter are preferred. However, quartz sand having a diameter of 0.1-2 mm may also be used.

The alkaline earth carbonate particles in the nanometer range are preferably produced by wet milling, however, and/or are brought to the desired equivalent diameter in particular when it is natural alkaline earth carbonate.

Also, both, dry and wet milling steps may be performed in succession, but the last milling step is then preferably wet milling.

The alkaline earth carbonate may be dispersed and/or milled in the presence of one or more milling aids and/or dispersants, e.g., in the form of an aqueous slurry, preferably having a solids content of the alkaline earth carbonate of more than 10 wt %, more than 20 wt %, e.g., 15 to 30 wt %, preferably more than 30 wt %, more preferably more than 50 wt %, better yet more than 60 wt %, e.g., having a solids content of 65 to 68 wt %, especially preferably more than 70 wt %, e.g., having a solids content of 72-80 wt %.

Without milling aids and/or dispersants, the alkaline earth carbonate may preferably be dispersed and/or milled at a solids content of up to 30 wt %, e.g., 15-30 wt %. At a solids content of more than 30 wt % it may be better to disperse and/or mill the material in the presence of milling aids and/or dispersants.

Concentrations of less than or equal to 30 wt %, wet milling may be performed even without chemical aids. Such products, but also alkaline earth carbonate slurries having a low solids content of less than or equal to 60 wt %, for example, may be concentrated, preferably physically, e.g., by filter pressing and/or centrifuging and/or thermally and using one or more dispersants. Combinations of mechanical and thermal concentration steps are especially preferred. The final concentrations after concentrating are preferably at more than 60 wt % solids content, especially preferably between 65 wt % and 78 wt %, e.g., 72±2 wt %.

Anionic milling aids and/or dispersants may be used as the milling aids and/or dispersants, preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid, e.g., Polysalt S from the company BASF, Ludwigshafen, are especially preferred. The molecular weight Mw of such products is preferably in the range of 2000 to 15000 g/mol; an Mw of 3000-7000 g/mol is especially preferred. However, the molecular weight Mw of such products is preferably in the range of 2000 to 150000 g/mol; an Mw of 15000 g/mol to 50000 g/mol is especially preferred, e.g., 35000 g/mol to 45000 g/mol. The molecular weight of the milling aids and/or dispersants is selected so that they do not act as binders but instead as parting compounds. The polymers and/or copolymers may be neutralized with monovalent and/or polyvalent cations or may have free acid groups. Suitable monovalent cations include, for example, sodium, lithium, potassium or ammonium. Suitable polyvalent cations include, for example, calcium, magnesium, strontium or aluminium. The combination of sodium and magnesium is especially preferred. Milling aids and/or dispersants such as sodium polyphosphates and/or polyaspartic acid as well as their alkali and/or alkaline earth salts, sodium citrate and amines and/or alkanolamines such as triethanolamine and triisopropanolamine may advantageously be used alone or in combination with others.

Especially in dry milling, the milling aids and/or dispersants may also be selected from the group comprising glycols, polyglycols, e.g., polyethylene glycols, ethylene oxide-propylene oxide-ethylene oxide block copolymers or alkanolamines such as triethanaolamine and triisopropanolamine or a mixture thereof. It is also possible to use other monomers or polymer additives such as ethylene-acrylic acid copolymers alone or in combination. The ratio of acrylic acid monomers in the copolymer with ethylene monomers is preferably 1:4 to 1:50; 1:4 to 1:10 is especially preferred and 1:5 is excellent.

The dispersants and/or milling aids may be used in an amount of about 0.01 wt % to 5 wt %, based on the total dry weight of the surface-mineralized organic fibers, e.g., in dry milling, 0.01-0.5 wt %, preferably 0.1-0.3 wt %.

They are especially preferably used in an amount of 0.2 to 1 mg/m$^2$ nanoparticle surface area, e.g., in an amount of 0.3 to 0.7 mg/m$^2$ nanoparticle surface area.

In wet milling, the dispersants and/or milling aids are advantageously present in an amount of about 0.05-2.0 wt %, preferably in an amount of 0.3 to 1.5 wt %, e.g., 1 wt % but also in an amount of about 0.4 to about 0.95 wt %.

The milling aid and/or dispersant supports the milling of the alkaline earth carbonate particles in the nano range by reducing the viscosity of the slurry thus increasing the mobility and free path length of the particles to be milled and the milling beads. This is advantageous in the later formation of the surface-mineralized organic fibers.

The viscosity of the slurry in wet milling is preferably less than 2500 mPa·s, more preferably less than 1500 mPa·s, especially less than 1000 mPa·s, more preferably less than 500 mPa·s and especially preferably in the range of 50-250 mPa·s, measured with a conventional Brookfield viscometer, e.g., of the type EV-2+ with disk spindle 3 and 100 rpm.

It is also possible to use further monomeric or polymeric additives such as ethylene-acrylic acid copolymers (EAA) or salts, alone or in combination, during milling and/or dispersing, in addition to using the milling aids and/or dispersants. The ratio of acrylic acid monomers in the copolymer with ethylene monomers is preferably 1:4 to 1:50, especially preferably 1:4 to 1:10 and in particular 1:5. Preferred are EAA and/or the salts thereof, which in the unneutralized form have a melt viscosity of 3000 mPa·s to 25000 mPa·s, from 15000 mPa·s to 100000 mPa·s and from 50000 mPa·s to 400000 mPa·s at 200° C., 170° C. and/or 140° C., preferably from 3000 mPa·s to 7000 mPa·s, from 15000 mPa·s to 20000 mPa·s and from 50000 mPa·s to 100000 mPa·s at 200° C., 170° C. and/or 140° C. and in particular having a melt viscosity of 15000 mPa·s to 25000 mPa·s, from 50000 mPa·s to 100000 mPa·s and from 300000 mPa·s to 400000 mPa·s at 200° C., 170° C. and/or 140° C.

An EAA copolymer having a melt viscosity of 24300 mPa·s at 200° C., 88300 mPa·s at 170° C. and 367000 mPa·s at 140° C. is especially preferred.

Commercially available, very suitable EAAs, preferably having an acrylic acid content of 20 mol %, are distributed by BASF, Germany or Dow, USA, for example.

Use of EAA copolymers or their salts produces a partial or complete hydrophobization of the pores of the substrate, e.g., of the coated paper and/or the pores of the surface-mineralized organic fibers themselves, among other effects, so that the wetting of the open pores of the paper and/or the coating and/or the surface-mineralized organic fibers by water is reduced, controlled and/or prevented.

If EAA salts are used, they are partially or completely neutralized, e.g., with amines, preferably selected from the group comprising 2-amino-2-methyl-1-propanol, 3-amino-1-propanol, 2-[bis(2-hydroxyethyl)amino]ethanol and/or alkaline metal ions such as potassium, lithium and/or sodium or mixtures thereof, preferably with sodium. For example, at least 70 mol % or at least 95 mol % of the carboxylic acid groups are neutralized.

EAAs and their salts may be used in an amount of 0.01 wt % to 10 wt %, based on the total dry weight of the surface-mineralized organic fibers, preferably from 0.01 wt % to 5 wt %, more preferably 0.05 to 5 wt %, 0.1 wt % to 2 wt %, e.g., in an amount of 1.0 wt %.

The inventive surface-mineralized fibers preferably contain from 5 to 50 wt %, more preferably 10 to 30 wt %, even more preferably 17 to 27 wt %, e.g., 25 wt % fibers, based on the total dry weight of the fibers and nanoparticles. The inventive surface-mineralized fibers preferably contain, based on the total dry weight of the fibers and nanoparticles, from 95 to 50 wt %, preferably 90 to 70 wt %, more preferably 87 to 73 wt %, e.g., 75 wt % alkaline earth carbonate nanoparticles.

The fibers and the nano alkaline earth carbonate are preferably present in a ratio of 1:20, in particular in a ratio of 1:4, more preferably in a ratio of 1:3 or 1:2, but also in a ratio of 1:1, based on the dry weight. Most especially preferably the weight ratio of fibers to alkaline earth carbonate nanoparticles is 1:1 or 1:10.

The binder used in the inventive surface-mineralized organic fibers consists of a copolymer comprising as the monomer one or more dicarboxylic acids and one or more monomers from the group of diamines, triamines, dialkanolamines or trialkanolamines and epichlorohydrin.

Preferably saturated or unsaturated, branched or unbranched $C_2$-$C_{10}$ dicarboxylic acids, preferably $C_3$-$C_9$ dicarboxylic acids, $C_4$-$C_8$ dicarboxylic acids, $C_5$-$C_7$ dicarboxylic acids, in particular adipic acid are used as the dicarboxylic acid monomers.

Especially suitable as the second monomer of the binder polymer are linear and branched, substituted and unsubstituted diamines and triamines, in particular N-(2-aminoethyl)-1,2-ethanediamine. Preferably used dialkanolamines and trialkanolamines include, for example, diethanolamine, N-alkyl-dialkanolamines such as N-methyl and N-ethyldiethanolamine and triethanolamine.

For monitoring and control of the molecular weight and/or the chain length, one or more monovalent amines such as monoalkanolamines may be used during the polycondensation. Monoethanol is used preferably.

The resulting intermediate product is reacted further with epichlorohydrin.

In an especially preferred embodiment according to the present invention, a copolymer of adipic acid with N-(2-aminoethyl)-1,2-ethanediamine and epichlorohydrin is used as the binder.

The inventive binder may have a neutral or cationic charge. It preferably has a cationic charge.

To control the charge, anionic polymers such as sodium polyacrylates or sodium polyvinyl sulfates may be used.

For charge-based neutralization of 100 g binder, e.g. 10-50 g, especially preferably 20-40 g, ideally 25-30 g, based on the dry solids of a sodium polyacrylate having an Mw of 25000 to 28000 g/mol is needed.

The binder serves to improve adhesion of the nanoparticles to the surface of the fibers and is selective to the extent that essentially only nanoparticles are bound to fibers, but nanoparticles and/or fibers are not bound to themselves to form larger unwanted aggregates.

Based on the total dry weight of the surface-mineralized organic fibers, the binder is advantageously present in an amount of about 0.3 to about 10 wt %, preferably about 0.5 to about 5 wt %, especially preferably about 1 to about 3 wt %.

The surface-mineralized organic fibers especially preferably contain about 3 to about 15 wt %, e.g., 9 wt % binder, based on the organic fibers.

Another aspect of the present invention is a method for producing the inventive surface-mineralized organic fibers in which the organic fibers, the nano alkaline earth carbonate composition and the binder are provided and mixed.

The binder is added either to the fibers or to the nano alkaline earth carbonate composition, which are then mixed together well. It is also possible for the fibers or the nano alkaline earth carbonate composition to be mixed together first and then the binder added to the resulting mixture.

However, the binder may also be present in an aqueous form, e.g., an aqueous solution or slurry to which first the fibers are added and then the nano alkaline earth carbonate composition is added or first the nano alkaline earth carbonate composition is added and then the fibers are added and the mixture is then homogenized.

In principle, the fibers as well as the nano alkaline earth carbonate composition may be used either dry or as an aqueous slurry. If the fibers and the nano alkaline earth carbonate composition are used in dry form, however, enough water must be added first to form an aqueous slurry.

The nano alkaline earth carbonate composition is usually provided in the form of an aqueous slurry, whereas the fibers may be used in solid form or in the form of an aqueous slurry.

The term "solid" is not necessarily to be understood as "dry." The term "solid" should describe only the consistency of the substance used, which may definitely have a substantial moisture content. For example, a mixture of 50 wt % fibers with 50 wt % water may nevertheless have a solid consistency.

The binder is preferably provided in an aqueous form, e.g., in the form of a solution, emulsion or slurry, especially preferably as a solution.

To ensure better dispersion, a dispersant may be added to each of the components or mixtures, e.g., in the form of an aqueous solution and/or a powder of a dispersant selected from the group comprising polyacrylic acid salts such as the sodium salt, sodium polyphosphate or polymaleic/acrylate copolymers.

After combining the binder with the resulting reaction mixture or before combining the binder with the fibers or the alkaline earth carbonate composition, the dispersant(s) may be added to the component to which the binder is subsequently added or to the component which is admixed with it.

In a special embodiment, the two slurries of fibers and/or the nano alkaline earth carbonate composition are first mixed together. Then the binder is added to this mixture and the resulting slurry is homogenized. In homogenization, a dispersant may be added before, with or after the binder; preferably it is added before the binder.

In another embodiment, the binder is added to a slurry of the fibers and the resulting mixture is homogenized. The homogenized mixture is next combined with the slurry of the nano alkaline earth carbonate composition, optionally with the addition of a dispersant.

These dispersants may be used in an amount of 0.01 wt % to 2 wt %, based on the total dry weight of the surface-mineralized organic fibers, preferably in an amount of 0.1 wt % to 1 wt %, e.g., 0.5 wt %. They support the adsorption of the binder. Especially preferably, 0.2 to 1 mg/m$^2$, e.g., 0.5 mg dispersant/m$^2$ nano carbonate surface is used.

It is especially advantageous if the ratio of the amount of dispersant to the amount of binder in the surface-mineralized organic fibers is 1:5 to 1:20, e.g., 1:10, each based on the solids content.

The mixing and homogenizing of the slurries of the fibers and/or the nano alkaline earth carbonate composition including the admixing and stirring of the binder may be performed with a stirrer of the Pendraulic type, for example, with a toothed disk having a diameter of 3.5 cm as the stirrer, preferably at 5-90° C., especially preferably at room temperature, at about 20-25° C.

Likewise, mixing and homogenizing of the slurries by means of a plowshare mixer is also possible, in particular when the dry carbonate nanoparticles are first mixed with the binder. Plowshare mixers function according to the principle of the mechanically induced fluidized bed. Plowshare blades rotate near the inside wall of a horizontal cylindrical drum and convey the components of the mixture out of the product bed and into the open mixing space. The mechanically induced fluidized bed ensures an intense mixing of even large batches in a very short period of time. Choppers and/or dispersers are used to disperse lumps in a dry operation. The equipment used here is available from Gebrüder Lödige Maschinenbau GmbH [Lödige Brothers Mechanical Engineering, Inc.], Paderborn, Germany.

If the dry nano alkaline earth carbonate composition is added only when the fibers have already been pretreated with the binder, this may be accomplished by means of a tubular mixing apparatus, e.g., by pumping the slurry through the tubular mixing apparatus by means of a centrifugal pump and introducing the slurry of pretreated fibers continuously through an intake tube into the tubular mixing apparatus. Such a tubular mixing apparatus is available, for example, from Ystral GmbH, Ballrechten-Dottingen, Germany.

The mixing may be performed at a room temperature of about 20-25° C. Heating during the production process, e.g., due to friction during the dispersing operation, need not necessarily be counteracted. The temperature during the process may usually be 20-90° C., preferably between 20° C. and 70° C.

A combination of various mixing systems may be used.

The water content of the surface-mineralized organic fibers obtained according to the inventive manufacturing process may be reduced. They may be dried so that the surface-mineralized organic fibers are obtained as solids, but they may also be processed further as a slurry, or as a renewed aqueous slurry of the dried surface-mineralized organic fibers, so that not only the inventive surface-mineralized organic fibers per se, but also an aqueous slurry thereof may constitute a solution according to the present invention.

The solids content of the surface-mineralized organic fiber slurry may also be increased, thermally, e.g., in a microwave or in an oven, or mechanically, e.g., by filtration, reducing the water content, or it may be reduced by adding water.

Additional aspects of the present invention include the possible uses of the surface-mineralized organic fibers, whether in a solid, moist or dry state or as an aqueous slurry.

Thus, one of the main uses of the surface-mineralized organic fibers or the slurry thereof is the use in papermaking. They may be used, for example, as a filler or pigment. The advantage of use of the inventive surface-mineralized organic fibers in papermaking is that especially high filler contents of nano alkaline earth carbonates can be achieved. Retention of these nano fillers is especially facilitated by their presence in the surface-mineralized organic fibers.

In papermaking the surface-mineralized organic fibers are preferably used in amounts of 5 to 70 wt %, preferably 10 to 50 wt %, based on the total weight of the paper. Preferred amounts of the inventive surface-mineralized organic fibers per m$^2$ paper are, for example, 0.5 to 500 g/m$^2$, more preferably 2 to 100 g/m$^2$, especially preferably 5 to 50 g/m$^2$.

The surface-mineralized organic fibers may also be used in multilayer systems, e.g., in cardboard.

Their use in paints and spackling compounds for application to a porous substrate such as clay, cement or wood, which have a tendency to different absorption of particles of different sizes, which in turn can lead to segregation of mixtures, is especially advantageous.

The inventive surface-mineralized organic fibers may also be used together with other conventional pigments and/or fillers, e.g., talc, kaolin and conventional fiber materials such as wood fibers, cellulose fibers and cotton fibers.

The present invention thus also includes fillers or pigments and fibers comprising inventive surface-mineralized organic fibers or a slurry thereof.

The inventive surface-mineralized organic fibers are also very suitable for use in surface finishing of paper, for example, in and/or on plastics, cement and clay surfaces, in paints and varnishes.

In addition, the surface-mineralized organic fibers according to the present invention are advantageously used in dry form as fillers in plastics for supporting and promoting the biodegradability, e.g., the disintegration of packaging films of polyolefins such as polyethylene or polypropylene after use.

Another aspect of the present invention includes the use of the inventive surface-mineralized organic fibers or a slurry thereof as filtration aids, either alone as a filtration layer or in or on a natural and/or synthetic carrier material such as cotton, cellulose and polyamide fibers. Due to the porous structure and low segregation of the surface-mineralized organic fibers, there is an optimal liquid transfer having good retention power for particulate matter at the same time.

Thus, a filtration aid comprising inventive surface-mineralized organic fibers or a slurry thereof is also an aspect of the present invention.

Finally, in view of the excellent binding properties of the binders in the inventive surface-mineralized organic fibers, another aspect of the present invention involves the use of a polymer comprising as monomer one or more dicarboxylic acids and one or more monomers from the group of diamines, triamines, dialkanolamines or trialkanolamines and epichlorohydrin for at least partial coating of fibers with a composition comprising alkaline earth carbonate nanoparticles such as those described above. The use of a polymer of adipic acid with N-(2-aminoethyl)-1,2-ethanediamine and epichlorohydrin as the binder is especially preferred.

The figures, examples and experiments described below serve to illustrate the invention and should not restrict it in any way.

DESCRIPTION OF THE FIGURES

Some of the figures described below are scanning electron micrographs (SEM) of various state-of-the-art mixtures and inventive surface-mineralized organic fibers. The mixtures and the inventive surface-mineralized organic fibers were adjusted to a concentration of 10 wt % in water. A few drops (about 100 mg) of each were diluted in 250 mL distilled water and filtered through a 0.2 µm pore membrane filter. The preparations obtained on the membrane filter were sputtered with gold and evaluated in the SEM.

EXAMPLES

Figure 1:
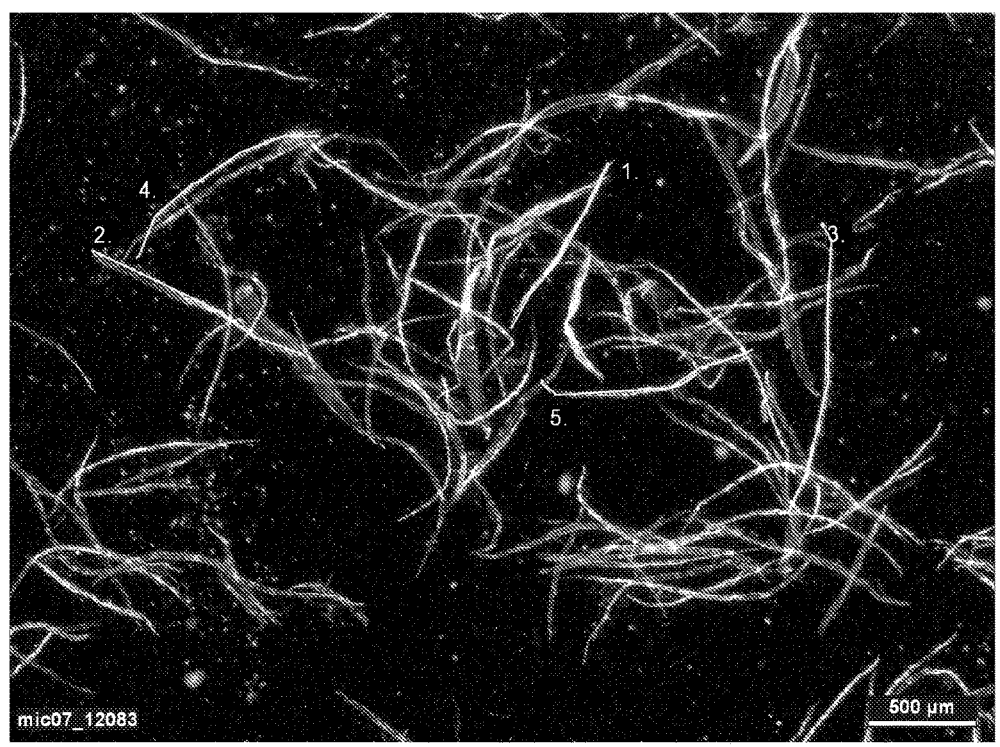
FIG. 1 shows a fiber mixture suitable for the inventive surface-mineralized organic fibers.

Preparation and Description of Nanoparticles Usable According to the Invention

The preparation of nano alkaline earth carbonate compositions suitable for the inventive surface-mineralized organic fibers is described below:

Nano alkaline earth carbonate composition 1 was continuously milled by wet milling in a vertical 160 liter attritor ball mill in two passes using limestone from the south of France dry premilled to an average spherical particle diameter of 45 µm in a conventional ball mill with iron cylpebs having a diameter of 2.5 cm, and using a total of 0.4 wt % sodium/magnesium polyacrylate having Mw=4000-8000 g/mol, based on the total dry weight of the nano alkaline earth carbonate as dispersant/milling aid at a solids content of 72 wt % to yield the following size distribution:

| Diameter (nm) | Number (N) of particles in N % | Wt % |
|---|---|---|
| <200 | 95.6 | 15.2 |
| 200-400 | 3.2 | 14.0 |
| 400-600 | 0.7 | 14.1 |
| 600-800 | 0.2 | 12.2 |
| 800-1000 | 0.1 | 10.8 |

The Brookfield viscosity of the slurry obtained after wet milling was 285 mPa·s. The specific surface area, measured according to BET, was 11.2 m$^2$/g (ISO 9277). The milling beads used were made of zirconium silicate and baddeleyite and had a size of 0.5-2 mm. Next the slurry was spray-dried (spray dryer type Mobile NIRO, model year 2005, GEA Niro A/S). The moisture content after drying was 0.13 wt %.

Nano alkaline earth carbonate composition 2 was continuously milled by wet milling in a vertical 160-liter attritor ball mill in two passes using Norwegian marble premilled dry in a conventional ball mill to an average spherical particle diameter of 45 µm, and using a total of 0.55 wt % sodium/magnesium polyacrylate having an Mw of 4000-8000 g/mol, based on the total dry weight of the nano alkaline earth carbonate as the dispersant/milling aid, at a solids content of 72 wt %, to yield the following size distribution:

| Diameter (nm) | Number (N) of particles in N % | Wt % |
|---|---|---|
| <200 | 96.3 | 17.8 |
| 200-400 | 2.8 | 14.2 |
| 400-600 | 0.5 | 12.6 |
| 600-800 | 0.2 | 10.7 |
| 800-1000 | 0.1 | 8.9 |

The Brookfield viscosity of the slurry obtained after wet milling was 128 mPa·s. The specific surface area, measured according to BET, was 12.6 m$^2$/g (ISO 9277). The milling beads used were made of zirconium silicate and baddeleyite and had a size of 0.5-2 mm.

Nano Alkaline earth carbonate composition 3 was fractionated using 45 kg nano alkaline earth carbonate composition 2 by means of a centrifuge. The slurry was dosed into the centrifuge (model KVT LAB-CUT LC 1000 classifier centrifuge, Krettek Verfahrenstechnik GmbH [Process Engineering, Inc.], D-41749 Viersen, Germany) using an Ismatec model GV-BES tubular squeeze pump. The dosing rate was 15-25 liters per hour. When the centrifuge was about 60% filled with centrifuge cake, the cycle was stopped and the coarse fraction was removed mechanically by means of a high-pressure cleaner. The ultrafine fraction was used further. By repeated separation of the coarse material, the desired grain fraction was produced, i.e., it was centrifuged at a low rotational speed at the beginning and the resulting fines were then centrifuged again at a higher rotational speed, etc., until achieving the desired fineness. Several batches were produced to obtain enough material.

In 9 passes the centrifuge was operated at 3500 rpm. The coarse fraction was discarded. With the fine fraction, another 8 passes were performed at 5000 rpm. Finally, 4 more batches were processed at 6000 rpm. 1 kg nano alkaline earth carbonate 3 having 50 wt % solids and the following size distribution was produced.

| Diameter (nm) | Number (N) of particles in N % | Wt % |
|---|---|---|
| <200 | 97.6 | 49 |
| 200-400 | 2.1 | 27.9 |
| 400-600 | 0.25 | 15.8 |
| 600-800 | 0.03 | 5.3 |
| 800-1000 | 0.003 | 1.4 |

The Brookfield viscosity of the slurry obtained after this preparation is 150 mPa·s. The specific surface area measured according to BET was 27.5 m$^2$/g (ISO 9277).

Description of Fibers Usable According to the Invention

The following fibers were used for the following experiments:

Fiber Mixture 1

Mixture of 20 wt % pine cellulose (long fibers) and 80 wt % beech cellulose (short fibers), SR degree of 23° of the mixture from Papierfabrik Biberist, Switzerland.

85 wt % moisture.
Fiber length about 0.5-3 mm
Fiber width about 0.02-1 mm
Fiber mixture 1 is shown in FIG. 1.

Fiber Mixture 2

Mixture of 10 wt % pine cellulose (long fibers), SR degree of 27° and 90 wt % wood pulp, SR degree of 79° from Papierfabrik Albbruck, Germany.

Figure 2:
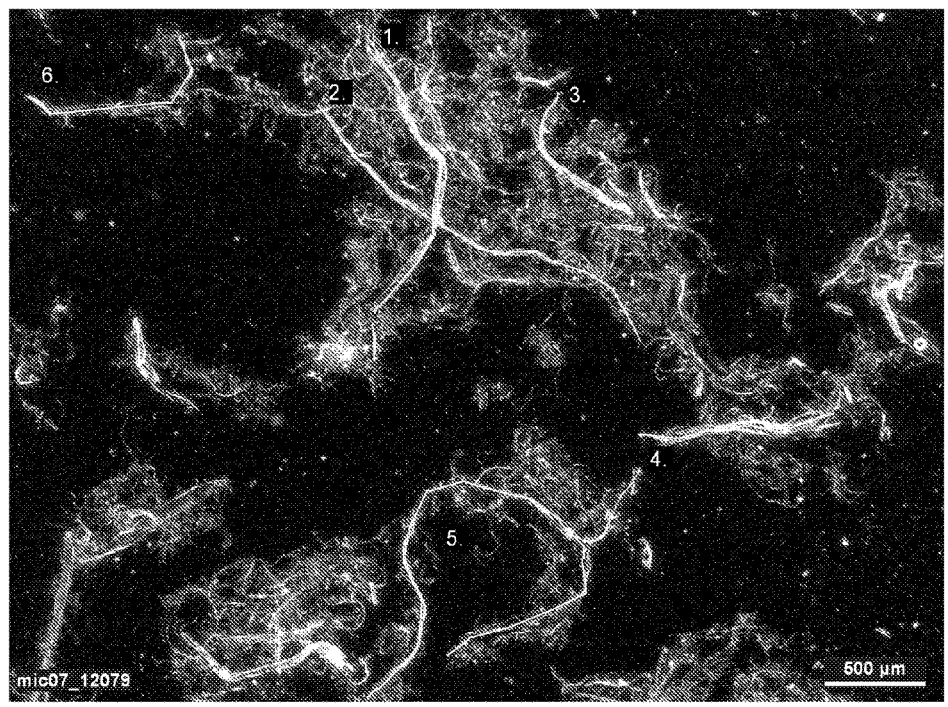
FIG. 2 shows a fiber mixture suitable for the inventive surface-mineralized organic fibers.

85 wt % moisture.
Fiber length about 0.5-3 mm
Fiber width about 0.1-0.5 mm
Fiber mixture 2 is shown in FIG. 2.

Production and Description of Binders Usable According to the Invention

Binder 1

15±0.5 wt % aqueous solution of a copolymer of adipic acid with N-(2-aminoethyl)-1,2-ethanediamine and epichlorohydrin having the following characteristics:
total chlorine content: about 1.5%
organic chlorine content: <0.5%
Mw>1000 g/mol
Brookfield viscosity of the aqueous solution: 80±30 mPa·s (Brookfield type EV-2+, disk spindle 3, 100 rpm; measured in a 250 mL low form glass beaker)
pH 3.0

Such products can be produced by a two-step synthesis process by a method with which those skilled in the art of organic synthesis are familiar. Production is done, e.g., by producing an intermediate product consisting of the reaction product of diethylenetriamine, monoethanolamine and adipic acid. Then in a second reaction, this intermediate product is reacted with epichlorohydrin using sulfuric acid and potassium sorbate as the catalyst to form the end product; the solids content is diluted with water to 12-20 wt % and the pH is adjusted to pH 3 with more sulfuric acid. Such polymers are sold by the company Lanxess, Germany, for example, under the brandname Nadavin, e.g., Nadavin DHN (15%), or the company Mare, Italy, under the brandname Maresin PD 125 (12.5%).

Preparation and Description of State-of-the-Art Mixtures

Comparative Experiment 1: Mixture of 25 wt % Fiber Mixture 1 and 75 wt % Nano Alkaline Earth Carbonate Composition 2

The fiber mixture 1 was diluted with water to 5 wt % solids content. The nano alkaline earth carbonate composition 2 was diluted with water to a solids content of 30 wt %. Then 300 g of the diluted fiber mixture 1 was mixed with 150 g of diluted alkaline earth carbonate composition 2 while stirring (500 rpm; impeller stirrer, diameter 30 mm). The resulting mixture had a solids content of about 12.6 wt %.

Results a) Test for Segregation by Means of a Membrane Filter

A filter test was performed to illustrate the segregation tendency of the mixture and to determine the filtration rate.

8 g of the obtained mixture were diluted with 200 mL water and this slurry was filtered using a membrane filter having a 0.2 μm pore diameter (pressure about 25 mbar, water jet pump, room temperature). The time required to filter 200 mL was measured. When segregation occurs nano alkaline earth carbonate penetrates first through and into the pores (cloudy filtrate). With time, a secondary filter cake is formed on the membrane filter and blocks the pores.

Filtration time: >4 hours

After 2 hours, only 130 mL filtrate were obtained. Filtration was concluded only after 4 hours and 30 minutes.

The filtration time definitely shows the clogging of the filter pores due to segregation of nanoparticles and fibers.

Figure 3:
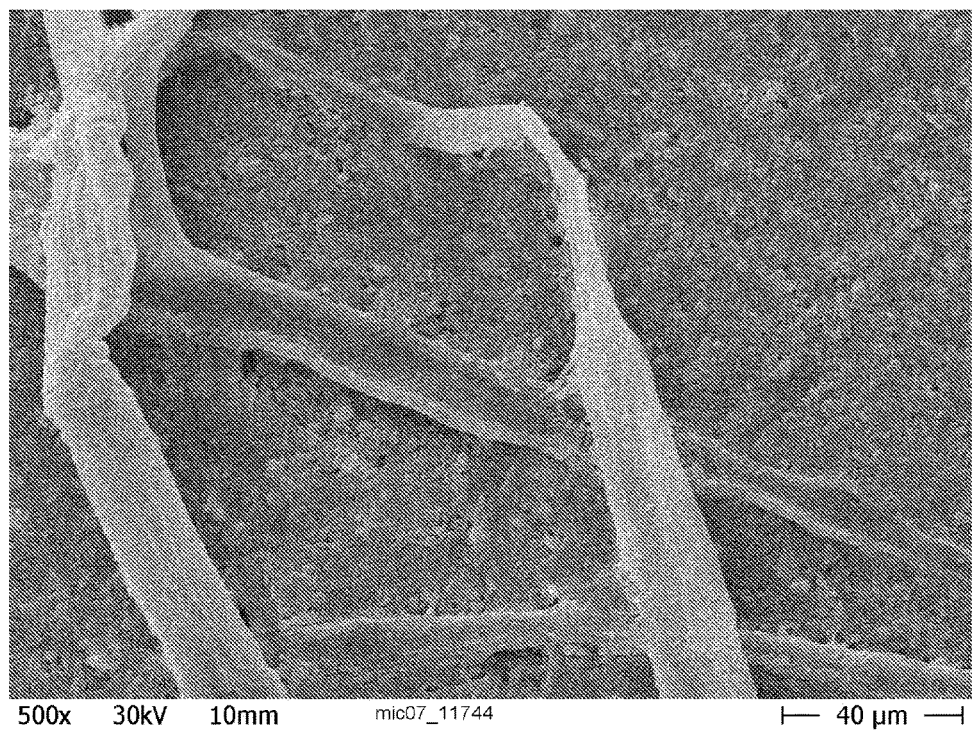
FIGS. 3 and 4 each show the SEM micrographs of state-of-the-art mixtures at two different magnifications.
Figure 4:
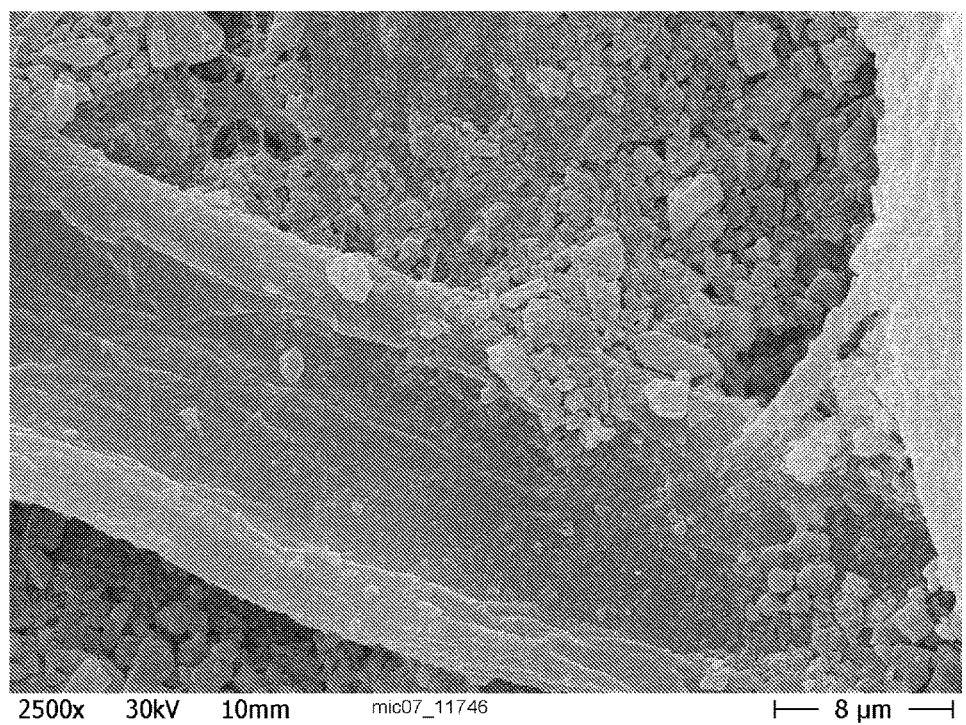

FIGS. 3 and 4 also show clearly the segregation of the nanoparticles from the fibers.

b) Test for Segregation on a Screen

In another segregation test, a 72 g sample of the mixture described above was diluted with water to 10 liters while stirring and filtered through a screen having a diagonal mesh of 150 μm. The resulting residue was dried at 110° C. and about 100 mbar for 5 minutes in a vacuum dryer of the same sheet-forming machine and then tested for the ash content. For this experiment a laboratory sheet-forming machine from the company of Gerd Schenkel (formerly Ernst Haage), D-45478 Mühlheim, Germany, was used.

The test was performed twice with the following results:

|  | Residue 1 | Residue 2 | Average |
|---|---|---|---|
| Paper weight | 73.4 g/m$^2$ | 65.5 g/m$^2$ | 69.5 g/m$^2$ |
| Ash 550° C. (based on g/m$^2$) | 10.6 g/m$^2$ | 9.5 g/m$^2$ | 10.1 g/m$^2$ |
| Ash 550° C. (wt % of paper weight) | 14.4% | 14.5% | 14.5% |

Production and Description of Inventive Surface-Mineralized Organic Fibers

Experiment 2: Mixture of 22 wt % Fiber Mixture 1 and 75 wt % Nano Alkaline Earth Carbonate Composition 2 and 3 wt % Binder 1

Fiber mixture 1 was diluted with water to 5 wt % solids content. 600 g of the diluted fiber mixture were mixed with 24 g binder 1 while stirring (at 500 rpm; impeller stirrer; diameter 30 mm; 5 minutes). Then 300 g of the resulting mixture was mixed with 54 g nano alkaline earth carbonate composition 2 while stirring (500 rpm; impeller stirrer; diameter 30 mm). The resulting surface-mineralized organic fiber slurry had a solids content of about 12.4 wt %.

Results a) Test for Segregation by Means of a Membrane Filter

A filter test was performed to illustrate the reduced segregation tendency of the surface-mineralized organic fibers and to determine the filtration rate.

8 g of the surface-mineralized organic fiber slurry were diluted with 200 mL water, and this slurry was filtered using a membrane filter having a 0.2 µm pore diameter (pressure about 25 mbar, water jet pump, room temperature). The time required to filter 200 mL was measured. When segregation occurs, nano alkaline earth carbonate penetrates first through and into the pores (cloudy filtrate). With time, a secondary filter cake is formed on the membrane filter and blocks the pores.
Filtration time: 4 minutes The filtration time shows clearly that the segregation of nanoparticles and fibers was prevented.
b) Test for Segregation on a Screen In another segregation test, 72 g of a sample of the slurry described above was diluted with water to 10 liters while stirring and filtered through a screen having a diagonal mesh of 150 µm. The residue thus formed was dried at 110° C. and about 100 mbar for 5 minutes in a vacuum dryer of the same sheet-forming machine and then tested for the ash content. For this experiment, a laboratory sheet-forming machine from the Gerd Schenkel company (formerly Ernst Haage), D-45478 Mühlheim, Germany was used.

The test was performed twice with the following results:

|  | Residue 1 | Residue 2 | Average |
| --- | --- | --- | --- |
| Paper weight | 89.9 g/m² | 82.0 g/m² | 86.0 g/m² |
| Ash 550° C. (based on g/m²) | 36.1 g/m² | 32.3 g/m² | 34.2 g/m² |
| Ash 550° C. (wt % of paper weight) | 40.2% | 39.4% | 39.8% |

In comparison with the state-of-the-art mixtures of comparative experiment 1, this result shows clearly that the nano alkaline earth carbonate was retained 2.75× better, based on the total weight of the sheet, and that about 3.5× more nano alkaline earth carbonate was retained per square meter. Segregation was reduced drastically in comparison with comparative experiment 1.

Figure 5:
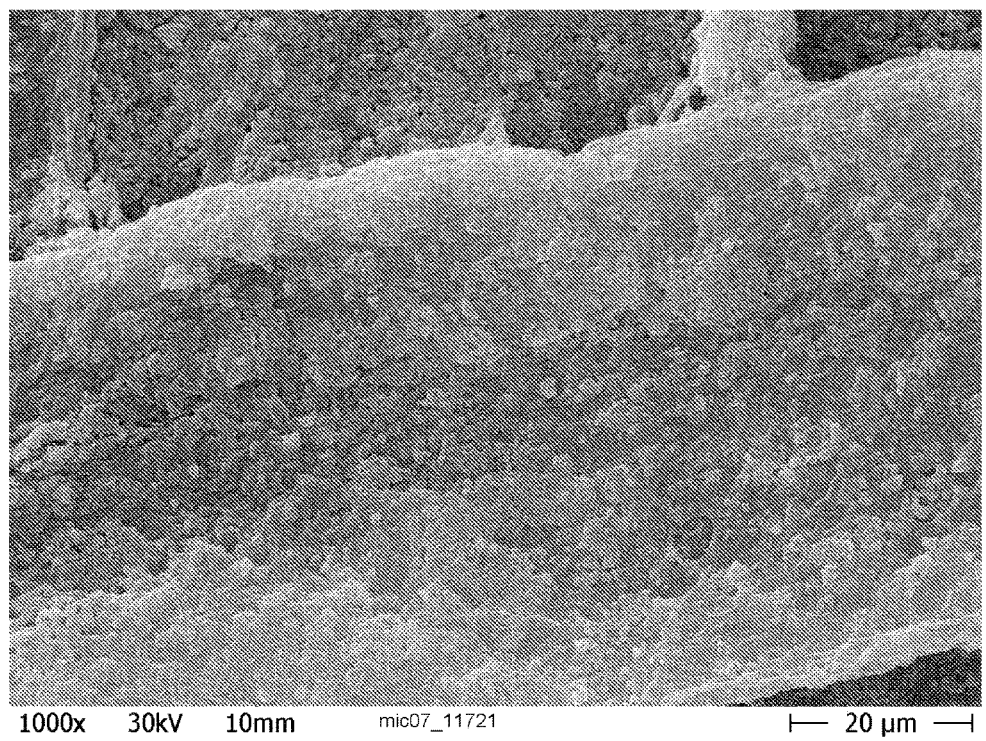
FIGS. 5 and 6 each show the SEM micrographs of a preparation of inventive surface-mineralized organic fibers consisting of fibers, nano calcium carbonate composition and binder at two different magnifications.
Figure 6:
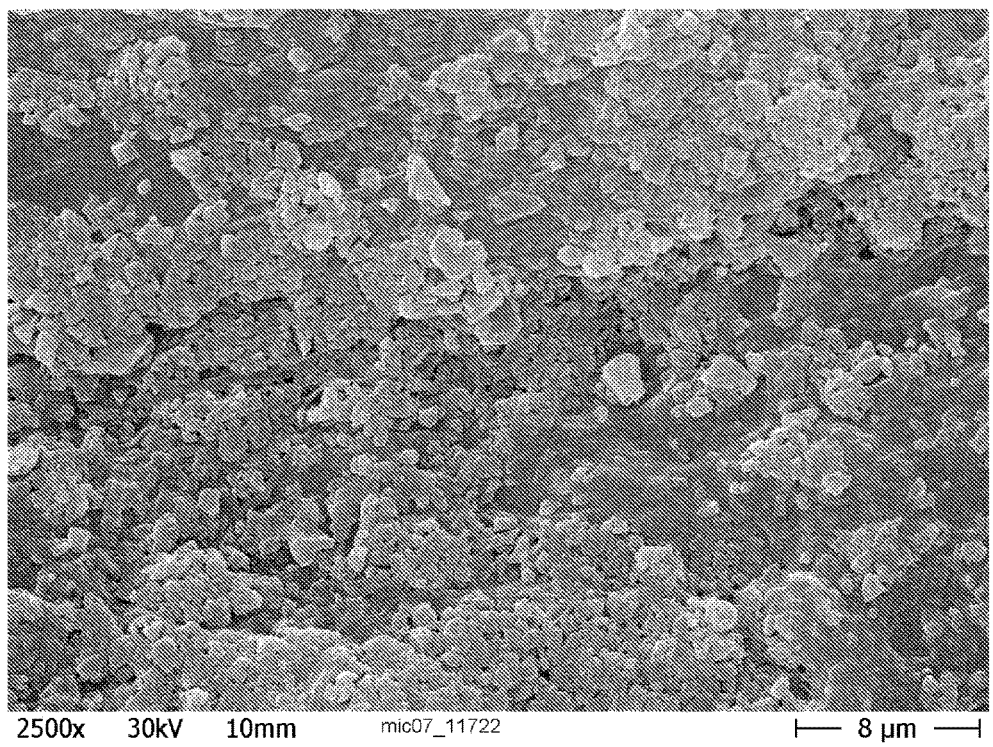

This is also confirmed by FIGS. 5 and 6, which clearly show the good coverage of fibers with nano calcium carbonate.

Figure 7:
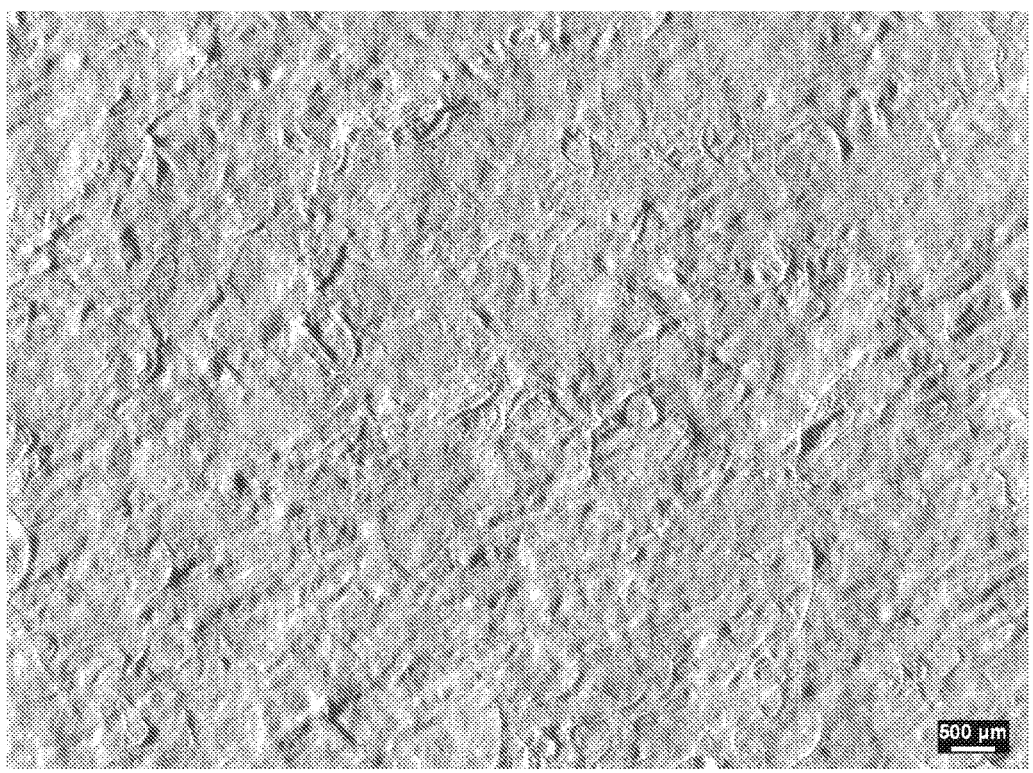
FIGS. 7 and 8 each show the light micrographs of a preparation of inventive surface-mineralized organic fibers consisting of fibers, nano calcium carbonate composition and binder as a paint on a raw clay plate at two different magnifications.
Figure 8:
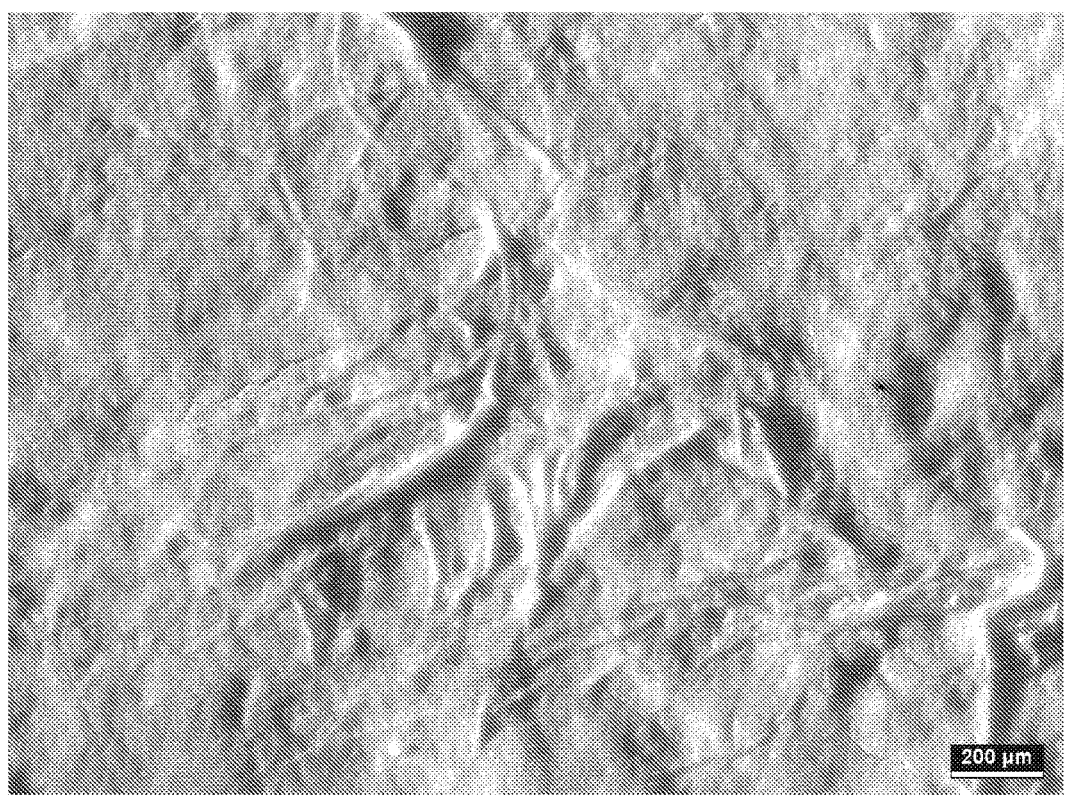

FIGS. 7 and 8 show that the surface-mineralized organic fibers do not exhibit any significant segregation even when applied as paint to a raw clay plate.

Experiment 3: Mixture of 22 Wt % Fiber Mixture 1 and 75 Wt % Nano Alkaline Earth Carbonate Composition 2 and 3 wt % Binder 1

Fiber mixture 1 was diluted with water to 5 wt % solids content. 300 g of the diluted fiber mixture were mixed with 54 g nano alkaline earth carbonate composition 2 while stirring (at 500 rpm; impeller stirrer; diameter 30 mm; 5 minutes). Then the resulting mixture was mixed with 24 g binder 1 while stirring (500 rpm; impeller stirrer; diameter 30 mm). The resulting surface-mineralized organic fiber slurry had a solids content of about 12.2 wt %.
Results
a) Test for Segregation by Means of a Membrane Filter A filter test was performed to illustrate the reduced segregation tendency of the surface-mineralized organic fibers and to determine the filtration rate.

8 g of the surface-mineralized organic fiber slurry were diluted with 200 mL water, and this slurry was filtered using a membrane filter having a 0.2 µm pore diameter (pressure about 25 mbar, water jet pump, room temperature). The time required to filter 200 mL was measured. When segregation occurs, nano alkaline earth carbonate penetrates first through and into the pores (cloudy filtrate). With time, a secondary filter cake is formed on the membrane filter and blocks the pores.
Filtration time: 9 minutes The filtration time shows clearly that segregation of nanoparticles and fibers was prevented.
b) Test for Segregation on a Screen In another segregation test, 72 g of a sample of the slurry described above was diluted with water to 10 liters while stirring and filtered through a screen having a diagonal mesh of 150 µm. The residue thus formed was dried for 5 minutes at 110° C. and about 100 mbar in a vacuum dryer of the same sheet-forming machine and then tested for the ash content. For this experiment, a laboratory sheet-forming machine from Gerd Schenkel (formerly Ernst Haage), D-45478 Mühlheim, Germany was used.

The test was performed twice with the following results:

|  | Residue 1 | Residue 2 | Average |
| --- | --- | --- | --- |
| Paper weight | 100.4 g/m² | 93.3 g/m² | 96.9 g/m² |
| Ash 550° C. (based on g/m²) | 39.0 g/m² | 37.8 g/m² | 38.4 g/m² |
| Ash 550° C. (wt % of paper weight) | 39.0% | 39.0% | 39.0% |

In comparison with the state-of-the-art mixtures of comparative experiment 1, this result shows clearly that the nano alkaline earth carbonate was retained 2.6× better, based on the total weight of the residue, and that about 3.6× more nano alkaline earth carbonate was retained per square meter. Segregation was reduced drastically in comparison with comparative experiment 1.

Figure 9:
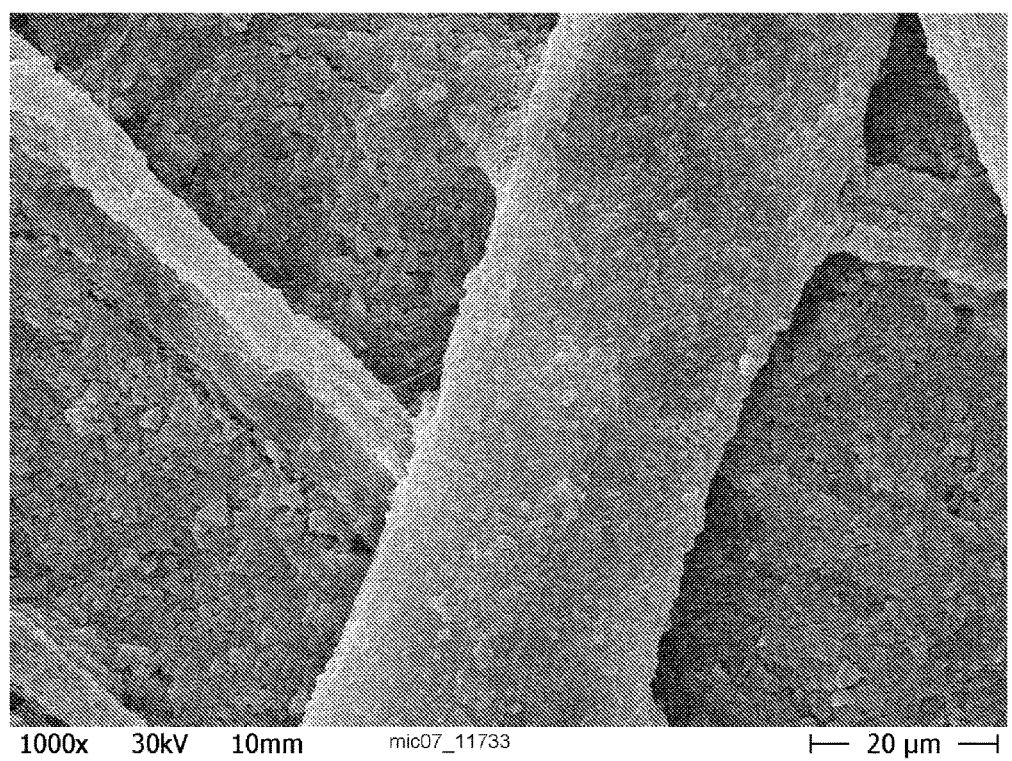
FIGS. 9 and 10 each show the SEM micrographs of a preparation of inventive surface-mineralized organic fibers consisting of fibers, nano calcium carbonate composition and binder at two different magnifications.
Figure 10:
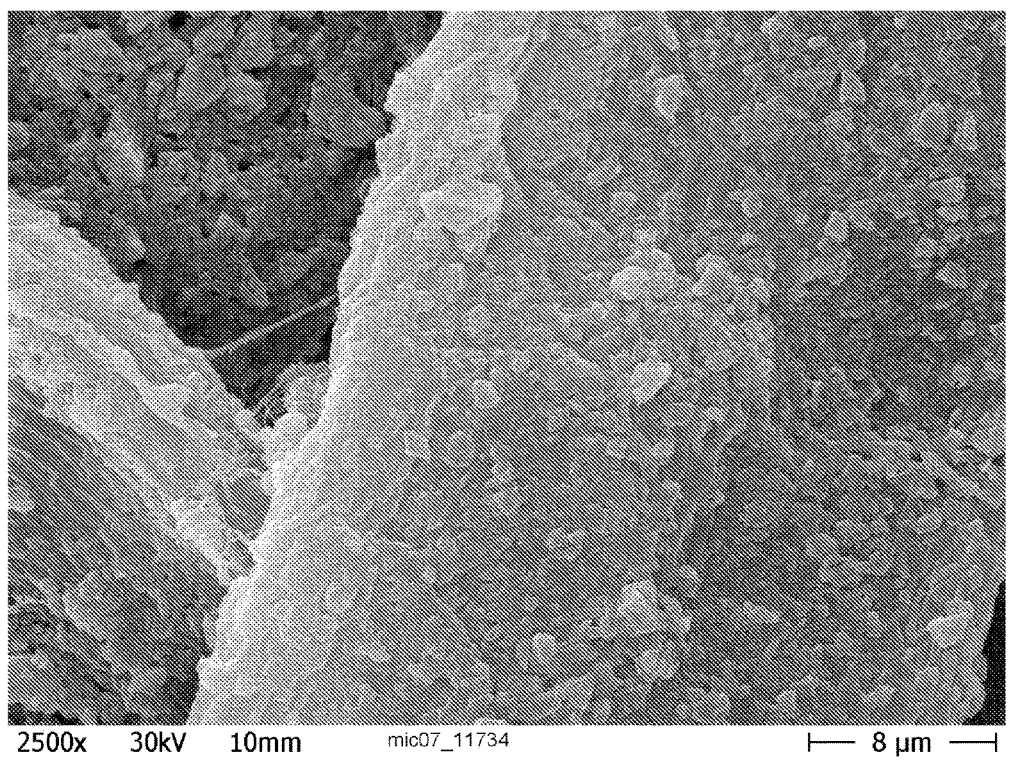

This is also confirmed by FIGS. 9 and 10, which show clearly the good coverage of the fibers with nano calcium carbonate.

Experiment 4: Mixture of 22 Wt % Fiber Mixture 1 and 75 Wt % Nano Alkaline Earth Carbonate Composition 1 and 3 wt % Binder 1

500 g nano alkaline earth carbonate composition 1 was coated with 100 g binder 1 within 15 minutes in a plowshare mixer. Fiber mixture 1 was diluted with water to 5 wt % solids content and 300 g of the diluted fiber mixture and 45 g water were mixed with 39 g of the pretreated nano alkaline earth carbonate composition 1 while stirring (at 500 rpm; impeller stirrer; diameter 30 mm; 5 minutes). The resulting surface-mineralized organic fiber slurry had a solids content of about 12.1 wt %.
Results
a) Test for Segregation by Means of a Membrane Filter A filter test was performed to illustrate the reduced segregation tendency of the surface-mineralized organic fibers and to determine the filtration rate.

8 g of the surface-mineralized organic fiber slurry were diluted with 200 mL water, and this slurry was filtered using a membrane filter having a 0.2 µm pore diameter (pressure about 25 mbar, water jet pump, room temperature). The time required to filter 200 mL was measured. When segregation occurs, nano alkaline earth carbonate penetrates first through and into the pores (cloudy filtrate). With time, a secondary filter cake is formed on the membrane filter and blocks the pores.
Filtration time: 4 minutes The filtration time shows clearly that segregation of nanoparticles and fibers was prevented.

b) Test for Segregation on a Screen

In another segregation test, 72 g of a sample of the slurry described above was diluted with water to 10 liters while stirring and filtered through a screen having a diagonal mesh of 150 μm. The residue thus formed was dried for 5 minutes at 110° C. and about 100 mbar in a vacuum dryer of the same sheet-forming machine and then tested for ash content. For this experiment, a laboratory sheet-forming machine from Gerd Schenkel (formerly Ernst Haage), D-45478 Mühlheim, Germany was used.

The test was performed twice with the following results:

|  | Residue 1 | Residue 2 | Average |
|---|---|---|---|
| Paper weight | 83.8 g/m$^2$ | 86.8 g/m$^2$ | 85.3 g/m$^2$ |
| Ash 550° C. (based on g/m$^2$) | 23.4 g/m$^2$ | 24.4 g/m$^2$ | 23.9 g/m$^2$ |
| Ash 550° C. (wt % of paper weight) | 27.9 | 28.1% | 28.0 |

In comparison with the state-of-the-art mixtures of comparative experiment 1, this result shows clearly that the nano alkaline earth carbonate was retained 2× better, based on the total weight of the residue, and that about 2.4× more nano alkaline earth carbonate was retained per square meter. Segregation was drastically reduced in comparison with comparative experiment 1.

Figure 11:
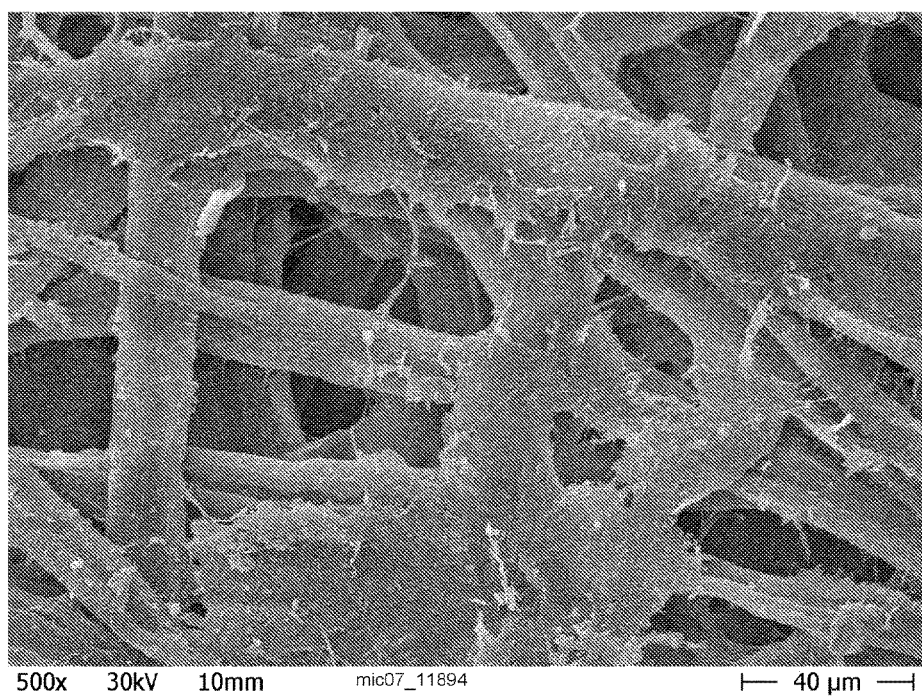
FIG. 11 shows the SEM micrograph of a preparation of inventive surface-mineralized organic fibers consisting of fibers, nano calcium carbonate composition and binder.

This is also confirmed by FIG. 11 which shows clearly the good coverage of the fibers with nano calcium carbonate.

Experiment 5: Mixture of 22 Wt % Fiber Mixture 2 and 75 Wt % Nano Alkaline Earth Carbonate Composition 3 and 3 Wt % Binder 1

Fiber mixture 2 was diluted with water to a solids content of 5 wt %. 300 g of the diluted fiber mixture were mixed with 90 g nano alkaline earth carbonate composition 3 and 700 g water while stirring (at 500 rpm; impeller stirrer; diameter 30 mm; 5 minutes). Then, 24 g binder 1 was diluted with 100 mL water while stirring (500 rpm; impeller stirrer; diameter 30 mm; 5 minutes) and mixed with the mixture also while stirring. The resulting surface-mineralized organic fiber slurry had a solids content of about 5.5 wt %.

Results a) Test for Segregation by Means of a Membrane Filter

A filter test was performed to illustrate the reduced segregation tendency of the surface-mineralized organic fibers and to determine the filtration rate.

8 g of the surface-mineralized organic fiber slurry were diluted with 200 mL water, and this slurry was filtered using a membrane filter having a 0.2 μm pore diameter (pressure about 25 mbar, water jet pump, room temperature). The time required to filter 200 mL was measured. When segregation occurs, nano alkaline earth carbonate penetrates first through and into the pores (cloudy filtrate). With time, a secondary filter cake is formed on the membrane filter and blocks the pores.

Filtration time: 4 minutes

The filtration time shows clearly that segregation of nanoparticles and fibers was prevented.

Figure 12:
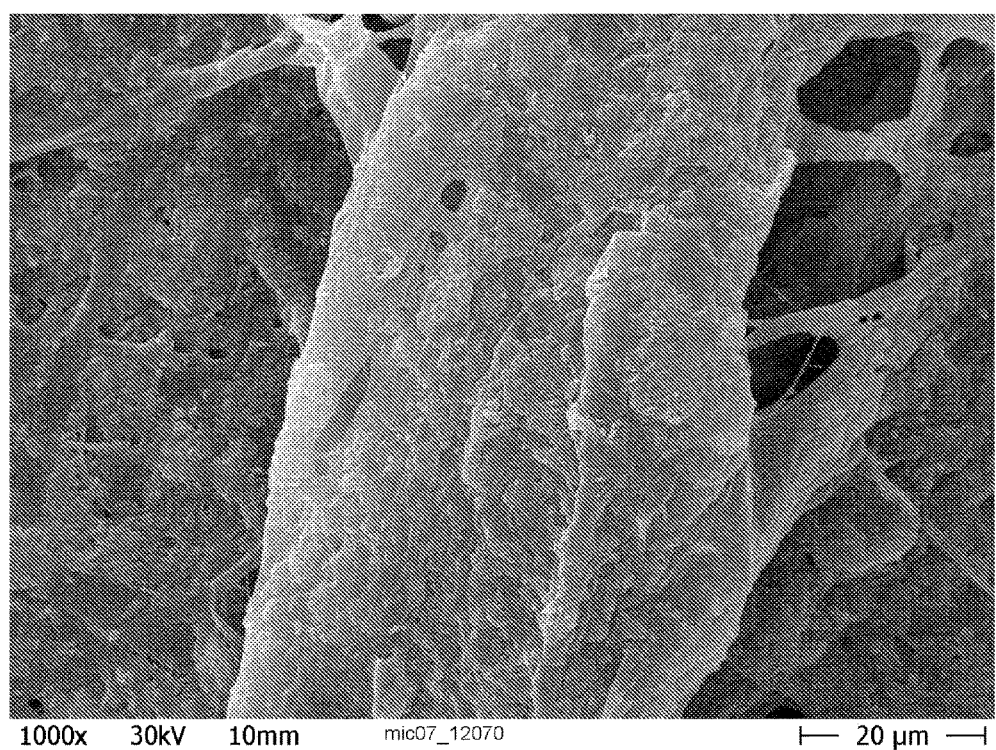
FIGS. 12 and 13 each show the SEM micrographs of a preparation of inventive surface-mineralized organic fibers consisting of fibers, nano calcium carbonate composition and binder at two different magnifications.
Figure 13:
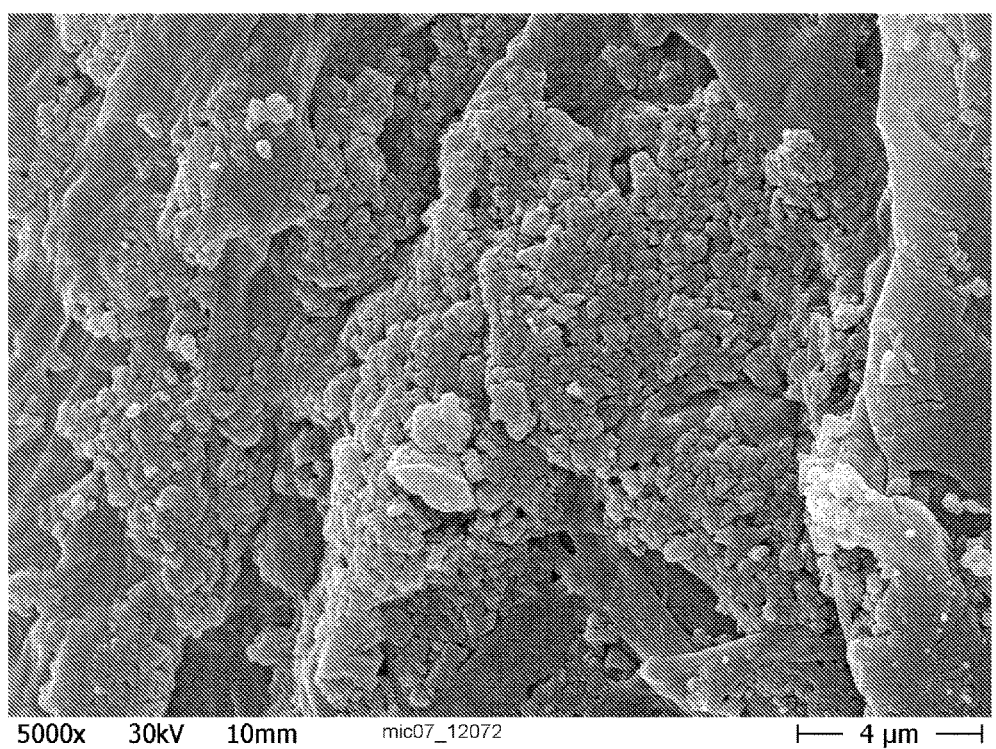

This is also confirmed by FIGS. 12 and 13, which definitely show the good coverage of the fibers with nano calcium carbonate.

Experiment 6: Mixture of 24 Wt % Fiber Mixture 1 and 75 Wt % Nano Alkaline Earth Carbonate Composition 2 and 1 Wt % Binder 1

Fiber mixture 1 was diluted with water to a solids content of 5 wt %. 300 g of the diluted fiber mixture were mixed with 54 g nano alkaline earth carbonate composition 2 while stirring (at 500 rpm; impeller stirrer; diameter 30 mm; 5 minutes). Then 72 g of the resulting mixture was diluted further with water to 10 liters and mixed with 0.66 g binder 1 while stirring (500 rpm; impeller stirrer; diameter 30 mm; 5 minutes). The resulting surface-mineralized organic fiber slurry had a solids content of about 0.1 wt %.

b) Test for Segregation on a Screen

In another segregation test, 72 g of a sample of the slurry described above was diluted with water to 10 liters while stirring and filtered through a screen having a diagonal mesh of 150 μm. The residue thus formed was dried for 5 minutes at 110° C. and about 100 mbar in a vacuum dryer of the same sheet-forming machine and then tested for ash content. A laboratory sheet-forming machine from Gerd Schenkel (formerly Ernst Haage), D-45478 Mühlheim, Germany, was used for this experiment.

This test was performed twice with the following results:

|  | Residue 1 | Residue 2 | Average |
|---|---|---|---|
| Paper weight | 100.1 g/m$^2$ | 96.9 g/m$^2$ | 98.5 g/m$^2$ |
| Ash 550° C. (based on g/m$^2$) | 38.0 g/m$^2$ | 35.6 g/m$^2$ | 36.8 g/m$^2$ |
| Ash 550° C. (wt % of paper weight) | 38.0% | 38.2% | 38.1% |

In comparison with the state-of-the-art mixtures of comparative experiment 1, this result shows clearly that the nano alkaline earth carbonate was retained 2.5× better, based on the total weight of the residue, and that about 3.6× more nano alkaline earth carbonate was retained per square meter. Segregation was drastically reduced in comparison with comparative experiment 1.

Experiment 7: Charge Neutralization of Binder 1

To determine the solids content of binder 1, about 0.8-1 g was weighed accurately to 1 mg and dried for 1 hour in a circulating air-drying cabinet at 150° C.

Then the solids content of a sodium polyacrylate having an Mw of 25000-28000 g/mol, such as that also used to produce the nano alkaline earth carbonate composition 3, was determined in the same way and next a 1 wt % aqueous measurement solution was prepared.

1 g, based on the solids content of binder 1, was diluted with water to 1 wt % and titrated to charge neutralization with 1 wt % sodium polyacrylate measurement solution using the Mütek PCD O$_2$ particle charge detector (BTG Instruments GmbH, 82211 Herrsching).

Result

To achieve a charge-based neutralization of 100 g binder 1, 10.36 g of a 42.8 wt % sodium polyacrylate solution having an Mw 25000-28000 is needed. Based on the solids content, 29.2 g 100 wt % sodium polyacrylate having an Mw of 25000-28000 g/mol was needed for charge neutralization of 100 g 100 wt % binder 1.

The invention claimed is:

1. An aqueous slurry comprising surface-mineralized organic fibers consisting of organic fibers coated at least partially with finely divided alkaline earth carbonate particles by means of a binder, wherein
the organic fibers have a length in the millimeter range;
92 to 98% of the alkaline earth carbonate particles, based on the number N of the alkaline earth carbonate particles, have a spherical equivalent diameter of less than 200 nm;

the binder is a copolymer comprising one or more dicarboxylic acids as a monomer; one or more monomers from the group of diamines, triamines, dialkanolamines or trialkanolamines; and epichlorohydrin, wherein the binder is optionally partially or completely neutralized by an anionic polymer; and wherein the organic fibers are present in an amount of 5 to 50 wt % based on the total dry weight of the organic fibers and the alkaline earth carbonate particles, the alkaline earth carbonate particles are present in an amount of 95 to 50 wt % based on the total dry weight of the organic fibers and alkaline earth carbonate particles, the binder is present in an amount of 0.3 to 10 wt % based on the total dry weight of the surface-mineralized organic fibers, the alkaline earth carbonate particles are natural ground calcium carbonate, precipitated calcium carbonate, a mixed carbonate, dolomite, or any mixture thereof, and wherein the alkaline earth carbonate particles are dispersed or milled in the presence of one or more milling aids and/or dispersants in an amount of 0.2 to 1 mg/m$^2$ of the alkaline earth carbonate particles, and the surface-mineralized organic fibers are optionally dispersed with an added dispersing agent.

2. The aqueous slurry according to claim 1, wherein the organic fibers are sustainable organic fibers.

3. The aqueous slurry according to claim 1, wherein the organic fibers are wood fibers, cellulose fibers, cotton fibers, or any mixture thereof.

4. The aqueous slurry according to claim 1, wherein the organic fibers are wood fibers, cellulose fibers, or a mixture thereof.

5. The aqueous slurry according to claim 1, wherein the organic fibers have a length in a range of 0.1 mm to 9.9 mm.

6. The aqueous slurry according to claim 1, wherein the organic fibers have a length in a range of 0.5 mm to 7.5 mm.

7. The aqueous slurry according to claim 1, wherein the organic fibers have a length in a range of 1 mm to 5 mm.

8. The aqueous slurry according to claim 1, wherein the organic fibers have a width or thickness in a range from 10 μm to 1000 μm.

9. The aqueous slurry according to claim 1, wherein the organic fibers have a width or thickness in a range from 20 μm to 750 μm.

10. The aqueous slurry according to claim 1, wherein the organic fibers have a width or thickness in a range from 50 μm to 200 μm.

11. The aqueous slurry according to claim 1, wherein the organic fibers have a length/width ratio or length/height ratio of 1:1 to 100:1.

12. The aqueous slurry according to claim 1, wherein the organic fibers are cellulose fibers having a length/width ratio or length/height ratio of at least 25:1.

13. The aqueous slurry according to claim 1, wherein the organic fibers are cellulose fibers having a length/width ratio or length/height ratio of at least 50:1.

14. The aqueous slurry according to claim 1, wherein the organic fibers are cellulose fibers having a length/width ratio or length/height ratio of at least 75:1.

15. The aqueous slurry according to claim 1, wherein the organic fibers are cellulose fibers having a length/width ratio or length/height ratio of at least 100:1.

16. The aqueous slurry according to claim 1, wherein the organic fibers are wood pulp having a length/width ratio or length/height ratio of 2:1 to 10:1.

17. The aqueous slurry according to claim 1, wherein the alkaline earth carbonate particles are natural ground calcium carbonate selected from marble, limestone, chalk or any mixture thereof.

18. The aqueous slurry according to claim 1, wherein the alkaline earth carbonate particles are natural ground calcium carbonate and/or precipitated calcium carbonate having a vateritic, calcitic or aragonitic crystal structure.

19. The aqueous slurry according to claim 1, wherein the dolomite of the alkaline earth carbonate particles are ground natural dolomite rock containing at least 50 wt % dolomite mineral.

20. The aqueous slurry according to claim 1, wherein the dolomite of the alkaline earth carbonate particles are ground natural dolomite rock containing at least 75 wt % dolomite mineral.

21. The aqueous slurry according to claim 1, wherein the dolomite of the alkaline earth carbonate particles are ground natural dolomite rock containing at least 90 wt % dolomite mineral.

22. The aqueous slurry according to claim 1, wherein the dolomite of the alkaline earth carbonate particles are ground natural dolomite rock containing more than 98% dolomite mineral.

23. The aqueous slurry according to claim 1, wherein 92% to 98% of the alkaline earth carbonate particles, based on the number N of the alkaline earth carbonate particles, have a spherical equivalent diameter in a range from 20 nm to 200 nm.

24. The aqueous slurry according to claim 1, wherein 92% to 98% of the alkaline earth carbonate particles, based on the number N of the alkaline earth carbonate particles, have a spherical equivalent diameter in a range from 50 nm to 180 nm.

25. The aqueous slurry according to claim 1, wherein 92% to 98% of the alkaline earth carbonate particles, based on the number N of the alkaline earth carbonate particles, have a spherical equivalent diameter of less than 150 nm.

26. The aqueous slurry according to claim 1, wherein 92% to 98% of the alkaline earth carbonate particles, based on the number N of the alkaline earth carbonate particles, have a spherical equivalent diameter in a range from 70 nm to 150 nm.

27. The aqueous slurry according to claim 1, wherein 92% to 98% of the alkaline earth carbonate particles, based on the number N of the alkaline earth carbonate particles, have a spherical equivalent diameter of less than 100 nm.

28. The aqueous slurry according to claim 1, wherein the alkaline earth carbonate particles are obtained by dry and/or wet milling steps.

29. The aqueous slurry according to claim 1, wherein the alkaline earth carbonate particles are dispersed and/or milled in the form of an aqueous slurry having a solids content of the alkaline earth carbonate of more than 10 wt %.

30. The aqueous slurry according to claim 1, wherein the alkaline earth carbonate particles are dispersed and/or milled in the form of an aqueous slurry having a solids content of the alkaline earth carbonate of more than 50 wt %.

31. The aqueous slurry according to claim 1, wherein the alkaline earth carbonate particles are dispersed and/or milled in the form of an aqueous slurry having a solids content of the alkaline earth carbonate of more than 70 wt %.

32. The aqueous slurry according to claim 1, wherein the dispersants and/or milling aids are present in an amount of 0.3 to 0.7 mg/m$^2$ particle surface area of the alkaline earth carbonate.

33. The aqueous slurry according to claim 1, wherein the ratio of the amount of the optionally added dispersant to the amount of binder in the surface-mineralized organic fibers, each based on the solids content, is 1:5 to 1:20.

34. The aqueous slurry according to claim 1, wherein the ratio of the amount of the optionally added dispersant to the amount of binder in the surface-mineralized organic fibers, each based on the solids content, is 1:10.

35. The aqueous slurry according to claim 1, containing from 10 to 30 wt % organic fibers, based on the total dry weight of the organic fibers and alkaline earth carbonate particles.

36. The aqueous slurry according to claim 1, containing from 17 to 27 wt % organic fibers, based on the total dry weight of the organic fibers and alkaline earth carbonate particles.

37. The aqueous slurry according to claim 1, containing from 95 wt % to 70 wt % alkaline earth carbonate particles, based on the total dry weight of the organic fibers and alkaline earth carbonate particles.

38. The aqueous slurry according to claim 1, containing from 87 wt % to 73 wt % alkaline earth carbonate particles, based on the total dry weight of the organic fibers and alkaline earth carbonate particles.

39. The aqueous slurry according to claim 1, wherein the organic fibers and the alkaline earth carbonate particles are present in a ratio of 1:20, 1:4, 1:3, 1:2, 1:1 or 1:10, based on the dry weight.

40. The aqueous slurry according to claim 1, wherein the dicarboxylic acid monomer of the binder comprises a saturated or unsaturated, branched or unbranched $C_2$-$C_{10}$ dicarboxylic acid, a $C_3$-$C_9$ dicarboxylic acid, a $C_4$-$C_8$ dicarboxylic acid, a $C_5$-$C_7$ dicarboxylic acid, or adipic acid.

41. The aqueous slurry according to claim 1, wherein the one or more monomers are selected from the group consisting of diamines, triamines, dialkanolamines or trialkanolamines comprises a linear or branched, substituted or unsubstituted diamine, triamine, dialkanolamine or trialkanolamine; N-(2-aminoethyl)-1,2-ethanediamine, diethanolamine; an N-alkyl-dialkanolamine, N-methyldiethanolamine, N-ethyldiethanolamine, and triethanolamine.

42. The aqueous slurry according to 57, wherein the binder is a copolymer of adipic acid with N-(2-aminoethyl)-1,2-ethanediamine and epichlorohydrin.

43. The aqueous slurry according to claim 1, wherein the binder is cationically charged.

44. The aqueous slurry according to claim 1, wherein the binder is partially or completely neutralized by an anionic polymer.

45. The aqueous slurry according to claim 1, containing 0.5 wt % to 5 wt % binder, based on the total dry weight of the surface-mineralized organic fibers.

46. The aqueous slurry according to claim 1, containing 1 wt % to 3 wt % binder, based on the total dry weight of the surface-mineralized organic fibers.

47. A method for producing the aqueous slurry according to claim 1, comprising the steps:
  a) providing the organic fibers;
  b) providing the finely divided alkaline earth carbonate particles that are dispersed or milled in the presence of one or more milling aids and/or dispersants in an amount of 0.2 to 1 mg/m² of the alkaline earth carbonate particles, wherein 92 to 98% of the alkaline earth carbonate particles, based on the number N of the alkaline earth carbonate particles, have a spherical equivalent diameter of less than 200 nm;
  c) providing the binder in aqueous form that is optionally partially or completely neutralized by an anionic polymer;
  d) mixing the organic fibers and the alkaline earth carbonate particles from a) and b);
  wherein the binder is added to the organic fibers from a) or the alkaline earth carbonate particles from b) before step d), and the resulting reaction mixture is homogenized to obtain an aqueous slurry comprising surface-mineralized organic fibers consisting of organic fibers coated at least partially with the alkaline earth carbonate particles by means of the binder, wherein the organic fibers are present in an amount of 5 to 50 wt % based on the total dry weight of the organic fibers and the alkaline earth carbonate particles, the alkaline earth carbonate particles are present in an amount of 95 to 50 wt % based on the total dry weight of the organic fibers and alkaline earth carbonate particles, the binder is present in an amount of 0.3 to 10 wt % based on the total dry weight of the surface-mineralized organic fibers, and the alkaline earth carbonate particles are natural ground calcium carbonate, precipitated calcium carbonate, a mixed carbonate, dolomite, or any mixture thereof.

48. A method for producing the aqueous slurry according to claim 1, comprising the steps:
  a) providing the organic fibers;
  b) providing the finely divided alkaline earth carbonate particles that are dispersed or milled in the presence of one or more milling aids and/or dispersants in an amount of 0.2 to 1 mg/m² of the alkaline earth carbonate particles, wherein 92 to 98% of the alkaline earth carbonate particles, based on the number N of the alkaline earth carbonate particles, have a spherical equivalent diameter of less than 200 nm;
  c) providing the binder in aqueous form that is optionally partially or completely neutralized by an anionic polymer;
  d) mixing the organic fibers and the alkaline earth carbonate particles of a) and b);
  wherein the binder is added to the mixture of organic fibers from a) and the alkaline earth carbonate particles from b) after step d), and the resulting reaction mixture is homogenized to obtain an aqueous slurry comprising surface-mineralized organic fibers consisting of organic fibers coated at least partially with the alkaline earth carbonate particles by means of the binder, wherein the organic fibers are present in an amount of 5 to 50 wt % based on the total dry weight of the organic fibers and the alkaline earth carbonate particles, the alkaline earth carbonate particles are present in an amount of 95 to 50 wt % based on the total dry weight of the organic fibers and alkaline earth carbonate particles, the binder is present in an amount of 0.3 to 10 wt % based on the total dry weight of the surface-mineralized organic fibers, and the alkaline earth carbonate particles are natural ground calcium carbonate, precipitated calcium carbonate, a mixed carbonate, dolomite, or any mixture thereof.

49. A method for producing the aqueous slurry according to claim 1, comprising the steps:
  a) providing the organic fibers;
  b) providing the finely divided alkaline earth carbonate particles that are dispersed or milled in the presence of one or more milling aids and/or dispersants in an amount of 0.2 to 1 mg/m² of the alkaline earth carbonate particles, wherein 92 to 98% of the alkaline earth carbonate particles, based on the number N of the alkaline earth carbonate particles, have a spherical equivalent diameter of less than 200 nm;

c) providing the binder in aqueous form that is optionally partially or completely neutralized by an anionic polymer;

wherein the binder is added first and then mixed with the organic fibers from a) and the alkaline earth carbonate particles from b), and the resulting reaction mixture is homogenized to obtain an aqueous slurry comprising surface-mineralized organic fibers consisting of organic fibers coated at least partially with the alkaline earth carbonate particles by means of the binder, wherein the organic fibers are present in an amount of 5 to 50 wt % based on the total dry weight of the organic fibers and the alkaline earth carbonate particles, the alkaline earth carbonate particles are present in an amount of 95 to 50 wt % based on the total dry weight of the organic fibers and alkaline earth carbonate particles, the binder is present in an amount of 0.3 to 10 wt % based on the total dry weight of the surface-mineralized organic fibers, and the alkaline earth carbonate particles are natural ground calcium carbonate, precipitated calcium carbonate, a mixed carbonate, dolomite, or any mixture thereof.

50. The method according to claim 47, wherein said one or more dispersants are added after combining the binder with the organic fibers from a) or the alkaline earth carbonate particles from b) or optionally the mixture from d).

51. The method according to claim 47, wherein said one or more dispersants are added before combining the binder with the organic fibers from a) or the alkaline earth carbonate particles from b) or optionally the mixture from d).

52. Surface-mineralized organic fibers in a solid, moist or dry state obtained by reducing the water content of the aqueous slurry according to claim 1.

53. Paper comprising the dried surface-mineralized organic fibers according to claim 52.

54. The paper according to claim 53, wherein the paper comprises 5 to 70 wt % of the surface-mineralized organic fibers, based on the total weight of the paper.

55. The paper according to claim 53, wherein the paper comprises 10 to 50 wt % of the surface-mineralized organic fibers, based on the total weight of the paper.

56. The paper according to claim 53, wherein the paper comprises 0.5 to 500 $g/m^2$ of the surface-mineralized organic fibers.

57. The paper according to claim 53, wherein the paper comprises 2 to 100 $g/m^2$ of the surface-mineralized organic fibers.

58. The paper according to claim 53, wherein the paper comprises 5 to 50 $g/m^2$ of the surface-mineralized organic fibers.

59. Paint or spackling compound comprising the aqueous slurry according to claim 1 or surface-mineralized organic fibers in a solid, moist or dry state obtained by reducing the water content of said aqueous slurry.

60. A plastic comprising the aqueous slurry according to claim 1 or surface-mineralized organic fibers in a solid, moist or dry state obtained by reducing the water content of said aqueous slurry.

61. Filler comprising the aqueous slurry according to claim 1 or surface-mineralized organic fibers in a solid, moist or dry state obtained by reducing the water content of said aqueous slurry.

62. Pigment comprising the aqueous slurry according to claim 1 or surface-mineralized organic fibers in a solid, moist or dry state obtained by reducing the water content of said aqueous slurry.

63. Filtration aid comprising the aqueous slurry according to claim 1 or surface-mineralized organic fibers in a solid, moist or dry state obtained by reducing the water content of said aqueous slurry.

64. The aqueous slurry according to claim 44, wherein the anionic polymer is a sodium polyacrylate having an Mw of 25000 g/mol to 28000 g/mol, or a sodium polyvinyl sulfate.

* * * * *